US011232113B2

(12) United States Patent
Eike et al.

(10) Patent No.: US 11,232,113 B2
(45) Date of Patent: Jan. 25, 2022

(54) METADATA-DRIVEN DATA MAINTENANCE

(71) Applicant: SAP SE, Walldorf (DE)

(72) Inventors: Bjoern Eike, Dossenheim (DE); Pascal Hochwarth, Sandhausen (DE); Marcel Kassner, Hockenheim (DE); Astrid Graeber, Walldorf (DE)

(73) Assignee: SAP SE, Walldorf (DE)

( * ) Notice: Subject to any disclaimer, the term of this patent is extended or adjusted under 35 U.S.C. 154(b) by 392 days.

(21) Appl. No.: 16/299,496

(22) Filed: Mar. 12, 2019

(65) Prior Publication Data

US 2020/0293523 A1 Sep. 17, 2020

(51) Int. Cl.
*G06F 16/2458* (2019.01)
*G06F 16/11* (2019.01)
*G06F 16/2453* (2019.01)
*G06F 16/22* (2019.01)
*G06F 16/908* (2019.01)
*G06F 16/215* (2019.01)

(52) U.S. Cl.
CPC ........ *G06F 16/2458* (2019.01); *G06F 16/125* (2019.01); *G06F 16/215* (2019.01); *G06F 16/2272* (2019.01); *G06F 16/24539* (2019.01); *G06F 16/908* (2019.01)

(58) Field of Classification Search
None
See application file for complete search history.

(56) References Cited

U.S. PATENT DOCUMENTS

| | | | |
|---|---|---|---|
| 7,213,022 B2 | 5/2007 | Whelan et al. |
| 7,454,701 B2 | 11/2008 | Graeber |
| 7,739,746 B2 | 6/2010 | Donahue |
| 8,091,024 B2 | 1/2012 | Graeber |
| 8,145,606 B2 | 3/2012 | Herbst et al. |
| 8,326,702 B2 | 12/2012 | Herrmann et al. |
| 8,401,928 B2 | 3/2013 | Herrmann et al. |
| 8,412,549 B2 | 4/2013 | Graeber et al. |
| 8,751,437 B2 | 6/2014 | Teichmann et al. |
| 9,213,700 B2 | 12/2015 | Panda et al. |
| 9,424,544 B2 | 8/2016 | Subramanian et al. |
| 9,442,635 B2 | 9/2016 | Rummler et al. |
| 9,710,857 B2 | 7/2017 | Flegel et al. |
| 2005/0097464 A1 | 5/2005 | Graeber |
| 2007/0156546 A1 | 7/2007 | Oppert et al. |
| 2007/0265860 A1 | 11/2007 | Herrmann et al. |
| 2008/0059543 A1 | 3/2008 | Engel |
| 2008/0120129 A1 | 5/2008 | Seubert et al. |
| 2008/0133388 A1 | 6/2008 | Alekseev et al. |
| 2009/0055733 A1 | 2/2009 | Graeber |

(Continued)

*Primary Examiner* — Scott A. Waldron
(74) *Attorney, Agent, or Firm* — Klarquist Sparkman, LLP

(57) ABSTRACT

Techniques and solutions are provided for metadata-driven data maintenance. One or more data object queries are obtained from one or more data object frameworks. One or more sets of data objects are received based on the one or more data object queries. One or more data object nets are built based on the one or more sets of data objects and the one or more data object frameworks and respectively associated with one or more processes. The one or more data object nets and their associated processes are analyzed. Data object maintenance is performed on the data objects of the one or more data object nets based on the analysis of the one or more data object nets and their associated processes.

20 Claims, 14 Drawing Sheets

(56) References Cited

U.S. PATENT DOCUMENTS

| | | |
|---|---|---|
| 2009/0150866 A1* | 6/2009 | Schmidt ................ G06Q 90/00 |
| | | 717/120 |
| 2010/0070946 A1 | 3/2010 | Herrmann et al. |
| 2010/0153158 A1 | 6/2010 | Wex et al. |
| 2011/0282704 A1 | 11/2011 | Graeber et al. |
| 2012/0030180 A1 | 2/2012 | Klevenz et al. |
| 2012/0130724 A1 | 5/2012 | Flegel et al. |
| 2012/0166319 A1 | 6/2012 | Deledda et al. |
| 2012/0173384 A1 | 7/2012 | Herrmann et al. |
| 2013/0030963 A1 | 1/2013 | Cramer et al. |
| 2013/0117242 A1 | 5/2013 | Kassner et al. |
| 2013/0179229 A1 | 7/2013 | Graeber et al. |
| 2014/0012830 A1 | 1/2014 | Hochwarth et al. |
| 2014/0122411 A1 | 5/2014 | Teichmann et al. |
| 2014/0189547 A1 | 7/2014 | Rummler et al. |
| 2015/0046881 A1 | 2/2015 | V et al. |
| 2016/0364395 A1 | 12/2016 | Shorten et al. |
| 2017/0131944 A1 | 5/2017 | Bruckner et al. |
| 2017/0316512 A1 | 11/2017 | Chang et al. |
| 2018/0150529 A1* | 5/2018 | McPherson ............ G06F 9/542 |
| 2019/0057101 A1* | 2/2019 | Esserlieu ............... G06F 16/125 |
| 2020/0250083 A1* | 8/2020 | Shilane ................ G06F 3/0652 |

\* cited by examiner

METADATA-DRIVEN DATA MAINTENANCE

FIELD

The present disclosure generally relates to data maintenance, including maintenance to comply with data collection and retention policies. Particular implementations relate to data object metadata structures and data object maintenance processes, and systems and methods for metadata-driven data and process maintenance, such as for archiving or deleting collected data.

BACKGROUND

In a productive Enterprise Resource Planning (ERP) system, the amount of data collected, including personal and protected data, grows over time and can become a large volume of data. Further, such data may be subject to various legal regulations, requiring varying degrees of maintenance and removal. Data is often coupled to certain processes, which may also be reliant on the data being available while the process is active. To reduce data volume and to be compliant with legal regulations, stored data must sometimes be deleted. However, ensuring that data is deleted at an appropriate time, to both comply with legal requirements and ensure system consistency and stability, is important and can be difficult. Challenges can especially arise from the huge number of different data sets and process variants, all of the combinations of which cannot practically be defined. Thus, there is room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method for metadata-driven enforcement of data retention policies is provided. A query for identifying one or more data objects for a first type of data object is stored. One or more references for the one or more data objects are stored. The one or more references may point to data objects of a different type. A request to perform data maintenance for the first type of data object is received. The query to identify one or more instantiated data objects of the first type is executed. One or more additional instantiated data objects are identified based on the one or more references. One or more data object nets are built based on the one or more instantiated data objects, the one or more additional instantiated data objects, and the one or more references. The one or more data object nets are respectively analyzed against one or more maintenance criteria. Based on the results of the analysis, maintenance is performed on data objects of the data object nets which met the one or more maintenance criteria.

A method for data maintenance is provided herein. A first data object framework is accessed to obtain a first data object query and a first data object reference. A second data object framework is accessed based on the first data object reference to obtain a second data object query. The first data object query is executed to obtain a first set of data objects. The second data object query is executed to obtain a second set of data objects. A relationship between a first data object from the first set of data objects and a second data object from the second set of data objects is determined. The first data object and the second data object are analyzed to determine their status for data object maintenance. One or more data object maintenance actions are performed on the first data object and the second data object based on the analysis.

A method for metadata-driven data maintenance is provided herein. One or more data object queries are obtained from one or more data object frameworks. One or more sets of data objects are received based on the one or more data object queries. One or more data object nets are built based on the one or more sets of data objects and the one or more data object frameworks and respectively associated with one or more processes. The one or more data object nets and their associated processes are analyzed. Data object maintenance is performed on the data objects of the one or more data object nets based on the analysis of the one or more data object nets and their associated processes.

The foregoing and other objects, features, and advantages of the invention will become more apparent from the following detailed description, which proceeds with reference to the accompanying figures.

DETAILED DESCRIPTION

Figure 1A:
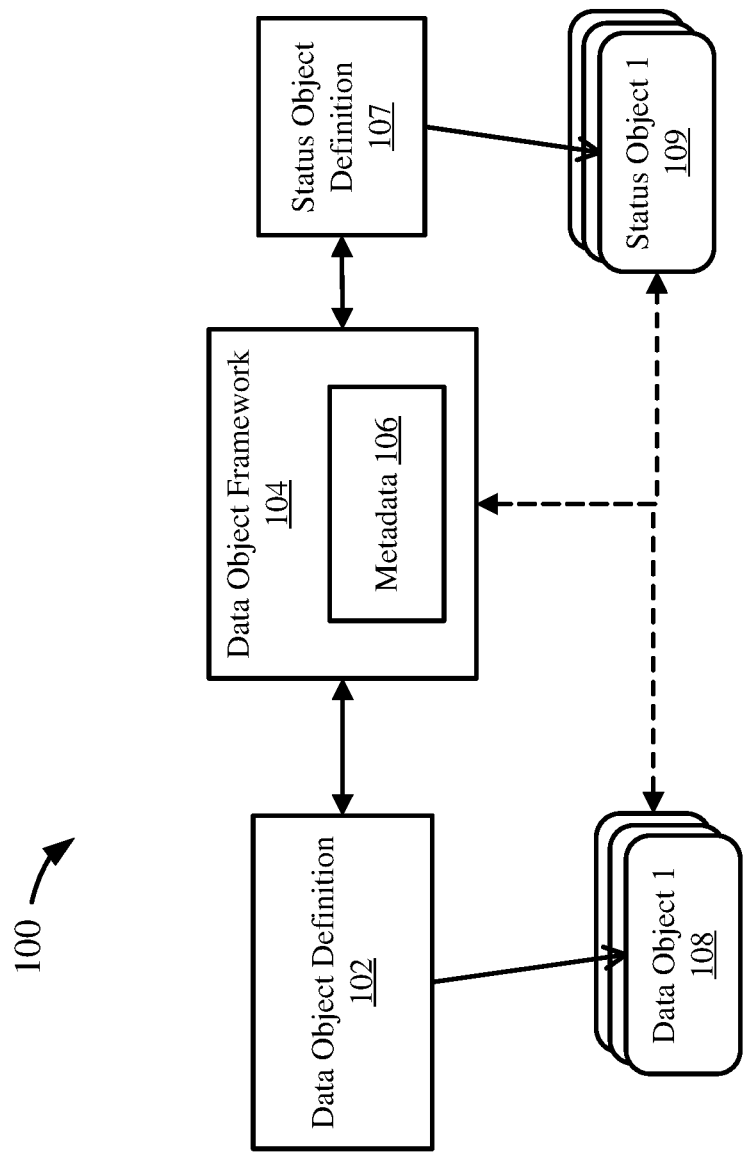
FIG. 1A is a relational diagram depicting data objects and a data object framework.

A variety of examples are provided herein to illustrate the disclosed technologies. The technologies from any example can be combined with the technologies described in any one or more of the other examples to achieve the scope and spirit of the disclosed technologies as embodied in the claims, beyond the explicit descriptions provided herein. Further, the components described within the examples herein may be combined or recombined as well, as understood by one skilled in the art, to achieve the scope and spirit of the claims.

Example 1

Data Maintenance System Overview

Many systems, such as Enterprise Resource Planning (ERP) systems, rely on collecting and using increasing amounts of data. Because of this, data maintenance and retention is becoming ever more important. Moreover, there are increasing societal and legal pressures to maintain collected data in particular ways. Often data retention is now limited in view of individual concerns over data usage. However, sifting through the large amounts of data collected and used to determine how to maintain what data can be difficult. Further, existing data archiving solutions ignore process consistency and delete business documents individually. Such action is hardly applicable in the public cloud world without highly trained IT professionals managing this archiving solution, which can be unduly burdensome as the amount of data increases.

While it is generally not possible to predefine a complete set of combinations of processes and data objects used by the processes, it is generally possible to predefine direct relationships between data objects, as data objects generally know their predecessors or prerequisite data objects. Using such information about inter-data object requirements, it is possible to collect and link all data objects of a specific process.

Using a metadata-driven approach, a unified layer may be built on top of an existing system that provides for data object maintenance and process closure (e.g., updating or deleting data objects when a computing process using such data objects has completed or otherwise has terminated). Such an abstraction layer for data object metadata may be built with little or no change to underlying data structures or data objects. In fact, disclosed techniques can be used in environments that have a high number of inhomogeneous data objects. A metadata-driven approach helps ensure high consistency across systems, and within each system, across data objects, with low development effort. Disclosed techniques can even be applied to an existing system without disruption.

Data object maintenance may generally occur when a process that uses the data objects is being closed or ready to be closed. Closing a process may include freezing the whole process and the associated data objects, making them no longer changeable. For example, a flag can be set in metadata for relevant data object instances that indicates that the data objects may no longer be updated (or, in some cases, read or updated). Locking data objects can make it easier to perform maintenance on the data objects. Maintenance actions can include blocking, locking or freezing (e.g. of data objects or processes), archiving, migrating, or deleting the data objects, or other lifecycle operations (or combinations thereof). Performing data maintenance may include acting on locally stored copies of data objects, or also acting on long-term or persistent storage copies of data objects (e.g. database storage). Performing such maintenance may reduce the data volume in the system, and may include removing data objects from incomplete processes that are no longer productive or executing (e.g. stalled or hung processes). Removing data objects from such incomplete processes helps ensure the system handles the data which is relevant and needed for the productive process, and does not keep or perpetuate data for hung or otherwise canceled processes.

Further, this metadata-driven approach to data maintenance ensures that data that is no longer needed is timely removed, such as by providing an active process for data maintenance. Timely data removal helps ensure compliance with new or forthcoming regulatory requirements, such as the General Data Protection Regulation (GDPR) in the EU. Thus, systems can become more respectful of data and data privacy while still collecting and using data efficiently and as authorized.

By generating a metadata framework for data objects and their relationships between each other and the processes using them, a process for data maintenance may be developed. The metadata structure and associated process, as described herein, are agnostic of the system processes, purposes, or data collected, analyzed, or otherwise used. Thus, the data maintenance system and process as described herein may be broadly applied to a wide variety of computing systems. Such a process may include: first, analyzing each data object for its current status and application of retention or deletion rules; second, the set of data objects for a process (a data object net) is analyzed based on the individual data object results, which may include analyzing incomplete processes; last, decoupling processes or their data objects completely from the system for data maintenance (e.g. deletion, archiving, migration), in place of performing maintenance data object-by-data object.

A data maintenance system for improved data management may be provided in data analytics software, database software, ERP software, or other data-driven software systems. Examples of such tools are: SAP Business ByDesign™, SAP Business One™, Supply Base Optimization™, Manage Supplier Negotiations™, Manufacturing Bill of Materials™, Enterprise Architect™, SAP HANA™, S/4HANA™, C/4 HANA™, HANAWebIDE/Studio™, all by SAP SE of Walldorf, Germany.

Example 2

Data Objects and Data Object Framework

FIG. 1A is a relational diagram 100 depicting data objects and a data object framework. A data object definition 102 may define a type of data object for use in a computing system. The data object definition 102 may be used to generate one or multiple instances 108 of the type of data object. A data object definition 102 may be a class definition, or other data structure or programmatic data definition. A data object definition 102 may be a database table definition or other database object definition, and the instances 108 may be rows in the defined table or instances of the database object. A data object definition 102 may be for a logical data object, such as may be defined by a schema, as described herein.

A data object definition 102 may be associated with a data object framework 104 for use with the data object definition or instances 108 of the data object definition, or both. The data object framework 104 may store information or functionality that is applicable to, or may be applied to, the data object definition 102 or the instantiated data objects 108, or both. The data object definition 102 may have data object metadata 106, which may further describe or define information for the instantiated data objects 108 or the data object definition 102. For example, the metadata 106 may store information about the type of data stored in the data object (e.g. computing, personal, sensitive, etc.) and can specify, or be referenced by, regimes for maintenance, retention, permissible use, etc.

The metadata 106 may store a query or search string for identifying sets of the instantiated data objects 108. Such a query may identify data object instances 108, of the definition 102, that meet criteria or rules for deleting, removing, or archiving the data objects. The query may identify data object instances 108 that meet criteria to set their status to "finished," or another indicator that the data object instance is no longer needed and can be removed. The metadata 106 may also include the rules for identifying when a data object instance 108 of that type 102 is no longer needed. Such rules may be retention rules that include type of data stored, required length to maintain such data, required times or events to delete such data, or other factors for maintaining or deleting the data object.

The metadata 106 may also include references to other data object definitions (other types of data objects). Such references may indicate, for example, the predecessor or successor data object types (e.g. definitions) for the given type of data object (e.g. definition 102). The references may represent a 1:1 relationship between data objects, a 1:n relationship, or a n:m relationship, where n and m are positive integers. In some embodiments, the references may be stored as a graph of data objects and their interrelationships. The data objects in the references may be instantiated data objects, or the relationships between data object definitions.

The metadata 106 may include a date or timestamp field for use as a retention start date, or lifetime start date for instantiated data objects. The metadata 106 may further include a status, along with possible status values, for the instantiated data objects. The status may indicate a data object instance's readiness for data maintenance, or its current use status in one or more processes. Processes that use data objects may be system processes, such as threads, or application-level processes.

The metadata 106 may include information for specific instances 108 of the data object definition 102. This reference information may include references between an instance 108 of this data object definition 102 and another data object instance, which may be of the same type (e.g. from this definition 102) or of another type. Such references may include an object ID for the base data object and an object ID for a linked data object. A linked data object may be another data object used by the same process, which is linked so that all data objects of the same process may be easily found, such as similar to a linked list data structure. Other specific information in the metadata 106 for data object instances may include a current retention status, such as "retain," "delete," "archive," "in-use," or "finished."

In some embodiments, the metadata 106 may be centrally stored, such as in a metadata repository (MDR), which may contain the metadata for all types of data objects, or for all instantiated data objects, or both.

A status object definition 107 may be available for the data object framework (or frameworks in a system). The status object definition 107 may be a specific type of data object definition 102, which defines a lightweight data object which may store some or all metadata, such as metadata 106, for an instance of a data object, such as data object 1 108. Thus, a status object may be a specialized data object. The status object definition may be used to instantiated status data objects 109. Generally, a status object 109 may be associated with an instance of a data object 108 and may store the metadata 106 specific to that data object instance. For example, a status object 1 109 may be instantiated for data object 1 108, and may store (e.g. be populated by) the metadata 106 for the data object 1. Thus, the status object definition 107 may be a design-time artifact, while the instantiated status objects 109 may be run-time artifacts (and similar for the data object definition 102 and data objects 108). Thus, a status object 1 may store run-time metadata for its associated data object 108.

Because the status objects 109 are lightweight data objects, they generally only store a small set of metadata fields for their respective data objects 108. Such metadata fields may include: type of data stored in the data object (e.g. TYPE_CODE), the object identifier for the data object (e.g. OBJECT_ID), the process identifier(s) for the process in which the data object is used (e.g. PROCESS_ID), the maintenance status of the data object (e.g. RETENTION_STATUS_CODE), the maintenance status of the process the data object is used in (e.g. PROCESS_RE-TENTION_STATUS_CODE), or a date (or dates) for measuring the lifetime of the data object (e.g. CREATION_DATE, LAST_CHANGED_DATE). The fields in the status objects 109 may be defined in the status object definition 107, or the data object framework 104, or the metadata 106, or some combination thereof. Generally, the status objects 109 may contain all the metadata fields needed to analyze their respective data objects 108 against data maintenance criteria, rules, or policies.

By instantiating status objects 109 for the data object instances 108, data maintenance analysis may be performed without accessing the data objects themselves (until data maintenance is actually performed based on the analysis). System overhead, such as memory and processing costs, may be kept low by ensuring that the status objects 109 are lightweight data objects, and often lower than the costs of executing data maintenance analysis on the data object instances 108 directly. Further, the data maintenance analysis may be performed on the status objects 109 without interrupting processing using the data objects 108 themselves.

Example 3

Logical Data Objects

Figure 1B:
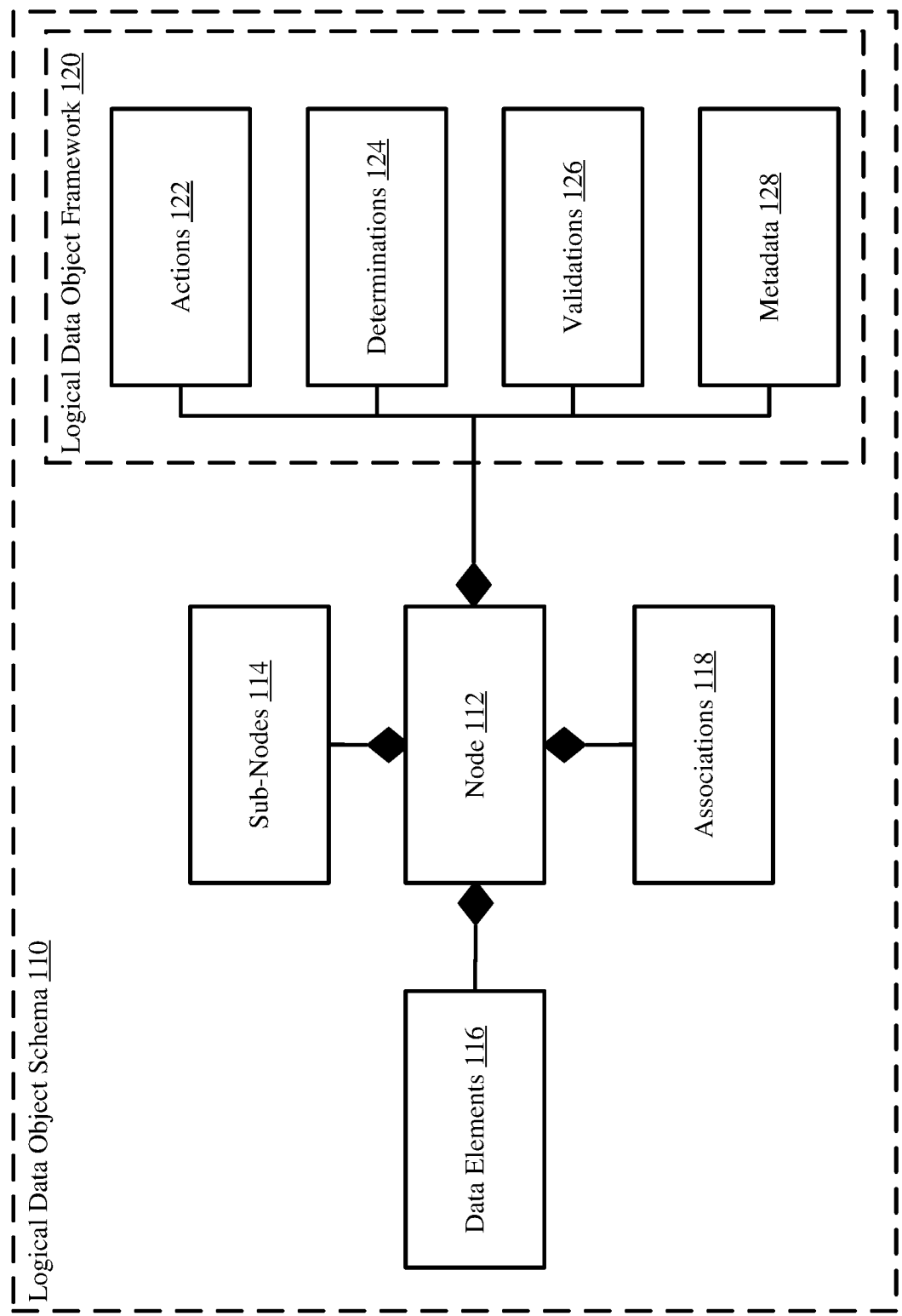
FIG. 1B is a diagram of an example logical data object schema.

FIG. 1B is a diagram of an example logical data object schema 110. A logical data object may be defined by a logical data object schema 110, which may include a definition of a hierarchical data structure and definitions of one or more operations, rules, or metadata that can be performed using portions of the hierarchical data structure. Such operations, rules, or metadata may be included as part of a logical data object framework 120 for the logical data object schema 110. Generally, a logical data object schema 110 is a definition or template used to generate specific logical data object instances based on the schema. Generally, a single logical data object schema 110 defines or represents a type of logical data object; a data system may hence have multiple logical data object schemas for defining different types of logical data objects.

In some cases, a logical data object may be referred to as a "business object" and can take any number of forms including business intelligence or performance management components such as those implemented in software technologies of SAP BusinessObjects™, ORACLE Hyperion™, IBM Cognos™, and others. However, the use of logical data objects in computer applications is not limited to "business" scenarios. Logical data objects can be used to define a particular application and/or problem domain space. Aspects and artifacts of a given problem domain can be defined using the hierarchical data structure and various portions of these aspects and/or artifacts can be associated directly with definitions of relevant logical operations.

A node 112 can contain one or more data elements 116. A data element 116 can contain an identifier, such as a name, and an associated value. The identifier can, for example, be associated with a field of a particular database table. In at least some embodiments, the data element 116 can be associated with a data type that restricts and/or validates the type of data that can be stored as a value of the data element 116.

The node 112 can contain one or more child nodes 114 (also referred to as sub-nodes), which can themselves contain additional data elements 116 (and other node components, including sub-nodes 114). Combinations of sub-nodes 114 can be used to define a hierarchical data structure of multiple nodes 112. In at least some embodiments, the hierarchical data structure can contain a root node that does not have a parent-node and can be used as an entry point for traversing the hierarchical data structure.

A logical data object schema 110 may have a logical data object framework 120. Generally, a logical data object schema 110 may be used as the definition or template for generating instances of a logical data object according to the schema. In some embodiments, a logical data object framework 120 is not included in logical data object instances of the logical data object schema 110. In such cases, a single logical data object framework 120 may serve all instances of the logical data object schema 110. In such embodiments, the logical data object framework 120 may contain information applicable to all instances of the logical data object schema 110, or information about particular instances of the logical data object schema (e.g. data about instances that is preferably stored in a central or abstracted location rather than with the particular instance itself, such as metadata 128).

In other embodiments, some portion of the logical data object framework 120 may be instantiated (e.g. duplicated, specified) in an instance of the logical data object schema 110. For example, one or more actions 122 may be included in an instantiation of the logical data object schema 110, while metadata 128 (for the logical data object schema 110 and instances of the logical data object schema) may be stored within the logical data object framework 120.

Each node 112 in the logical data object can be associated with one or more actions 122. An action 122 can comprise a definition for a logical operation that can be performed using the node 112 with which it is associated. The action 122 can contain an identifier that can be used to invoke the action's logical operation. Each node 112 in the logical data object can be associated with one or more determinations 124. A determination 124 can contain a definition for a logical operation that can be automatically executed when a trigger condition is fulfilled. Example trigger conditions can include a modification of the associated node 112, a modification of the data element 116 of the associated node, the creation of a data element 116 of the associated node, etc. A logical operation defined by an action 122, or a determination 124, can comprise instructions to create, update, read, and/or delete one or more data elements 116 and/or one or more sub-nodes 114. Actions 122 or determinations 124 can be set to trigger, in some cases, upon the occurrence of a particular date (e.g., a particular date or a particular time on a particular date).

Each node 112 in the logical data object schema 110 can be associated with one or more validations 126. A validation 126 can contain a definition of one or more data integrity rules and/or checks. The one or more data integrity rules and/or checks can be performed when the associated node 112, and/or one or more data elements 116 of the associated node, are created, modified, and/or deleted. Any such operation that does not satisfy the one or more data integrity rules and/or checks can be rejected.

Each node 112 in the logical data object schema 110 may be associated with metadata 128. In some embodiments, the metadata 128 may be associated with, or for, the logical data object schema 110 itself. The metadata 128 may store metadata information about the logical data object schema 110, specific instances of the schema, or some or all the instances of the schema. For example, the metadata 128 may store information about the type of data stored in the logical data object (e.g. computing, personal, sensitive, etc.).

The metadata 128 may store a query or search string for identifying sets of instances of the schema 110. Such a query may identify logical data object instances of the schema 110 that meet criteria or rules (e.g. validations 126 or determinations 124) for deleting, removing, or archiving the logical data objects. Executing a query may include identifying logical data object instances that meet query criteria to set their status to "finished," or another indicator that the logical data object instance is no longer needed and can be removed. The metadata 128 may also include the rules for identifying when a logical data object instance of the schema 110 is no longer needed. Such rules may be retention rules that consider a type of data stored, required retention duration, times or events at which to delete data, or other factors for retaining or deleting logical data object instances.

The metadata 128 may also include references to other logical data object schemas (other types of logical data objects), as described herein. Such references may indicate, for example, the predecessor or successor logical data object types (e.g. schemas) for the given type of logical data object (e.g. schema 110). In some embodiments, the references may be included in the associations 118 as well as, or in place of, in the metadata 128. Thus, the associations 118 may supplement the metadata 128.

The metadata 128 may include information for specific instances of the logical data object schema 110. This reference information may include references between an instance of this logical data object schema 110 and another logical data object, which may be of the same type (e.g. from this schema 110) or of another type. Such references may include an object ID for the base logical data object and an object ID for the next, or referenced, logical data object. Other specific information in the metadata 128 for logical data object instances may include a current retention status, such as "retain," "delete," "archive," "in-use," or "finished."

Each node 112 in the logical data object schema 110 can be associated with one or more nodes from one or more other logical data objects (having the same schema or a different schema) by one or more associations 118. An association 118 can contain an identifier for a node in another logical data object that is associated with the node 112. Associations 118 can be used to define relationships among nodes in various logical data objects. The association 118, in at least some embodiments, contains an association type indicator that identifies a type of association between the node 112 and the node in the other logical data object.

Although the action 122 is defined and associated with the node 112, when the action is invoked, it targets an identified instance of the node 112 with which it is associated. Similarly, a determination 124 and/or validation 126 can be defined and associated with a node 112, but can target an instance of the associated node 112 when it/they is/are invoked. Multiple instances of a given logical data object can be created and accessed independently of one another.

Although the instances of the logical data object share a common schema 110, the data values stored in their respective instances of nodes 112 and data elements 116 can differ, as can the logical data object instances that are associated by the associations 118. Additionally or alternatively, an instance of an association 118 can identify a particular instance of another logical data object instance, or of an associated node in another logical data object instance. The identifier of a node instance can be an alphanumeric string that uniquely identifies the instance and, in at least some cases, can be used to look the instance up and/or retrieve data associated with the instance. Particular examples of identifiers include numerical values and universally unique identifiers. However, other types of identifiers are also possible.

Various actions may be performed using logical data objects, including create, update, delete, read, and query operations. If the requested operation is a read operation, the data payload may contain a unique identifier associated with a logical data object instance to be retrieved. Processing a read operation request can comprise searching in a data store for an instance of the logical data object schema 110 that is associated with the provided unique identifier, and retrieving all or part of a matching logical data object instance's data from the data store. If the requested operation is an update operation, the data payload may contain one or more values to be assigned to data element instances of an existing logical data object instance. The data payload may also contain a unique identifier associated with the logical data object instance to be updated. Processing an update operation request can comprise searching for a logical data object instance in a data store associated with the provided unique identifier and updating the matching logical data object instance with the provided one or more data values.

Figure 1C:
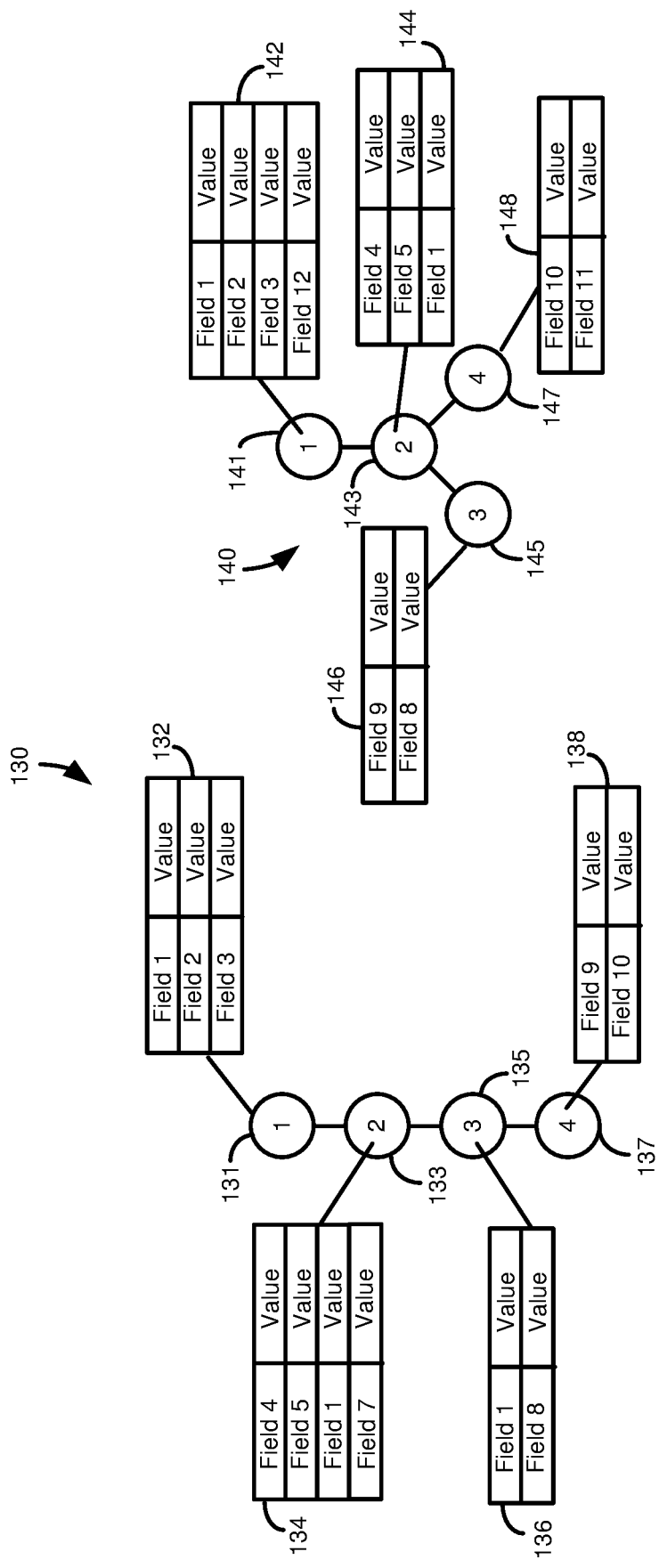
FIG. 1C illustrates portions of a logical data object and another logical data object based on different data object definitions.

FIG. 1C illustrates portions of a logical data object 130 and another logical data object 140, each defined by a separate logical data object schema, such as shown in FIG. 1B. Such logical data objects 130, 140 may be instantiated as depicted. Logical data object 130 may have a node 131 with a sub-node 133, which may have a sub-node 135, which may have a further sub-node 137. The nodes and sub-nodes 131, 133, 135, 137 may have respective data fields and values 132, 134, 136, 138. Based on a separate logical data object schema (e.g. data object definition), the logical data object 140 may have a node 141, which may have a sub-node 143, which may have two sub-nodes 145 and 147. These nodes and sub-nodes 141, 143, 145, 147 may have their respective fields and values 142, 144, 146, 148.

Although data fields 132, 134, 136, 138, 142, 144, 146, 148 are shown for purposes of illustration, it should be appreciated that one or more of actions, determinations, validations, associations, or metadata, such as shown in FIG. 1B may be present for, and can also differ between, the two logical data objects 130, 140, in place of, or in addition to, the data fields.

Example 4

Data Objects in Processes with Status Objects

Figure 2A:
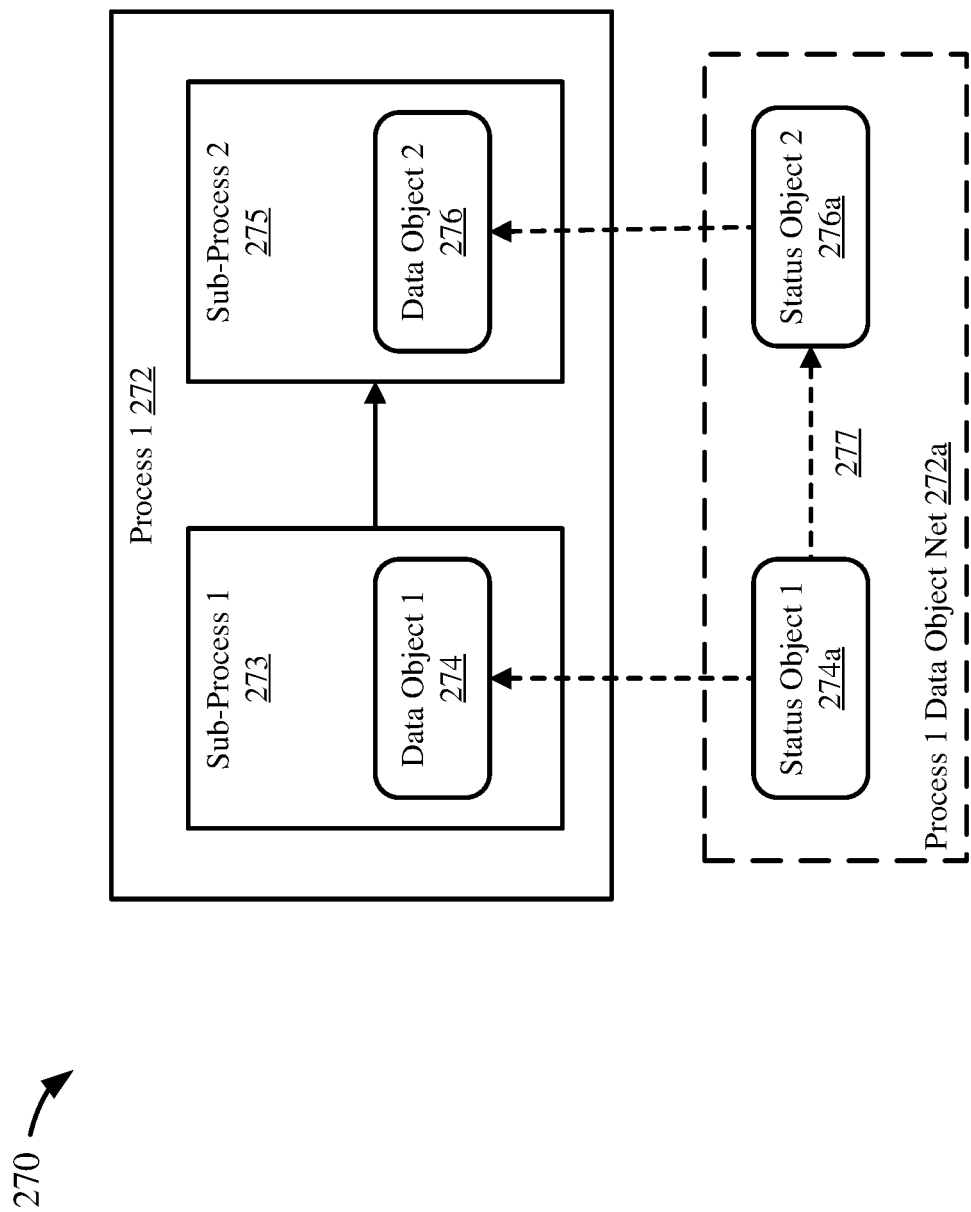
FIG. 2A depicts an example of a process with data objects and status objects.

FIG. 2A depicts an example 270 of a process with data objects and status objects. A process 1 272 may use two data object instances, data object 1 274 and data object 2 276. The data objects 274, 276 may have corresponding status objects, status object 1 274a for data object 1 and status object 2 276a for data object 2. The status objects 274a, 276a may have object identifiers for their respective data objects 274, 276. The status objects 274a, 276a may form or be accessed by a process 1 data object net 272a, which generally may have the status objects of all the data objects for process 1 272.

In some embodiments, data object 1 274 may be a predecessor of data object 2 276. For example, process 1 272 may have a sub-process 1 273 which may execute or complete before sub-process 2 275. Further, sub-process 1 273 may use data object 1 274 while sub-process 2 275 may use data object 2 276. Thus, data object 1 274 may be said to come before, or be a predecessor of, data object 2 276. Accordingly, the status objects 274a, 276a may be linked by a reference 277 from status object 1 to status object 2. The reference 277 may be object identifier of status object 2 276a.

In other cases, sub-process 1 273 and sub-process 2 275 may be separate stages of process 1 272, occurring in sequence.

In some embodiments, predecessors and successors may be designations for consistently linking data objects or status objects, but may not relate to an actual order in time of processing or use of the data objects. For example, sub-process 1 273 and sub-process 2 275 may be performed in parallel, and thus neither data object 1 274 nor data object 2 276 necessarily comes before or after the other. However, status object 1 274a may be deemed to precede status object 2 276a for the purposes of defining references between status objects, such as reference 277. Determining order to reference data objects in a process net 272a may be made based on the type frameworks of the data objects, as described herein.

Figure 2B:
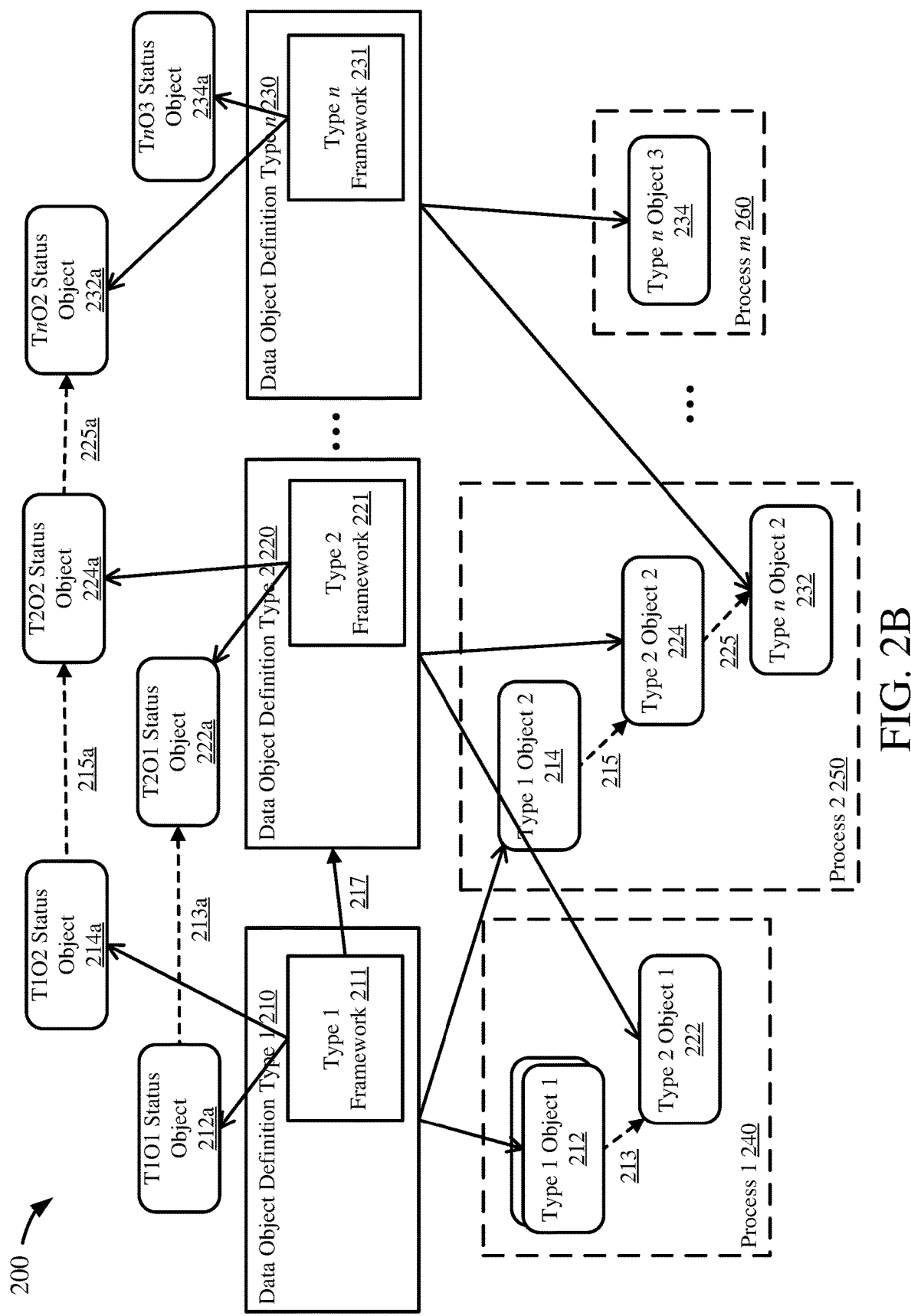
FIG. 2B depicts an example set of data objects instantiated from data object definitions.

FIG. 2B depicts an example set 200 of data objects instantiated from data object definitions. The example 200 can be implemented in database or other computing system. The database or system may have multiple data object Definitions 210, 220, 230 for different types of data objects. A data object definition can be, for example a schema, such as the schema 110 of FIG. 1B. A data object Definition type 1 210 may have a type 1 data object framework 211. Similarly, a data object Definition type 2 220 may have a type 2 framework 221 through a data object Definition for type n 230 may have a type n framework 231. The data object Definitions 210, 220, 230 may be used to instantiate data object instances 212, 214, 222, 224, 232, 234, of their respective types, which may be used in various processes 240, 250, 260.

The database or system may have multiple processes which utilize data objects, such as process 1 240, process 2 250, through process m 260. The processes 240, 250, 260 may be system processes, such as threads or jobs, or may be programming processes for performing particular functionality (which may be composed of, or mapped to, separate threads or jobs). The processes 240, 250, 260 may be separate instances of similar functionality, or may provide different functionality.

A Type 1 Object 1 212 may be a data object instance instantiated from the data object Definition type 1 210. Such instantiated data objects generally have an object identifier (ID). The Type 1 Object 1 212 may be used in process 1 240. In some embodiments, a process may have multiple instances of a given type of data object; generally, such instances will have separate object IDs. A Type 2 Object 1 222 may be a data object instantiated from the data object Definition type 2 220. The Type 2 Object 1 222 may be used in process 1 240, as well.

The Type 1 Object 1 212 may have a reference 213 to the Type 2 Object 1 222 to indicate that both data objects are used in the same process, process 1 240. The reference 213 may be stored in the Type 1 Framework 211, along with the object ID for the Type 1 Object 1 212 and the object ID for the Type 2 Object 1 222. Alternatively or additionally, the reference 213 may be stored with, or as part of, the Type 1 Object 1 212. Such references may be used to identify the data objects used in a process, or associate data objects together that are used in the same process. Thus, the references may be used to build a process data object net as described herein.

A Type 1 Object 2 214 may be a data object instantiated from the data object Definition type 1 210, and may be used in process 2 250. A Type 2 Object 2 224 may be a data object instantiated from the data object Definition type 2 220, and may be used in process 2 250. A Type n Object 2 232 may be a data object instantiated from the data object Definition type n 230, and may be used in process 2 250.

References may be used to associate the data objects 214, 224, 232 used in process 2 250. A reference 215 between the Type 1 Object 2 214 and the Type 2 Object 2 224 may be stored in the type 1 framework 211. A reference 225 between the Type 2 Object 2 224 and the Type n Object 2 232 may be stored in the type 2 framework 221.

A Type n Object 3 234 may be a data object instantiated from the data object Definition type n 230, and may be used in process m 260. As the Type n Object 3 234 is the only data object used in process m 260, no references are generated or stored for the Type n Object 3 234. If a data object is later instantiated and used by process m 260, a reference may be generated as well for the two data objects in process m, and may be stored in the appropriate framework.

In some embodiments, a framework 211, 221, 231 may have a general reference to another Definition type, in addition to specific references between instantiated data objects. For example, the type 1 framework 211 may have a reference 217 to the data object Definition type 2 220. Such a reference 217 may be used to indicate, such as for a process data object net, which type of data object(s) will come after (or before) its data objects. Thus, reference 217 may indicate that type 2 data objects may be expected after type 1 data objects. Such references between data object definitions (e.g. types) may also be used to indicate predecessors, alternatively or additionally, to indicating successors.

In some embodiments, the references may be bidirectional. In such cases, a reference between two objects may be stored for each object in their respective frameworks. For example, reference 213 may be stored for Type 1 Object 1 212 in the type 1 framework 211 and a similar reference may be stored for Type 2 Object 1 222 pointing to Type 1 Object 1 212 in the type 2 framework 221. Bidirectional references may allow data objects within a data object net to be traversed in either direction.

The data objects 212, 214, 222, 224, 232, 234 may have corresponding status objects 212a, 214a, 222a, 224a, 232a, 234a as part of their respective frameworks 211, 221, 231. The status objects 212a, 214a, 222a, 224a, 232a, 234a may be similar to the status objects as shown in FIG. 1A. Storing a data object references 213, 215, 225 in a framework 211, 221, 231 may include storing the reference in its data object's status object. Thus, references 213, 215, 225 may be stored as references 213a, 215a, 225a in the status objects 212a, 214a, 224a. For example, the reference 213 for Type 1 Object 1 212 to Type 2 Object 1 222 may be stored in Type 1 Object 1's status object, T1O1 Status Object 212a as reference 213a, which may point to the status object for Type 2 Object 1, T2O1 Status Object 222a. Similarly, the reference 215 may be stored in T1O2 Status Object 214a as reference 215a, which points to T2O2 Status Object 224a, and reference 225 may be stored in T2O2 Status Object 224a as reference 225a which points to TnO2 Status Object 232a.

The status objects 212a, 214a, 222a, 224a, 232a, 234a may be used to form data object nets based on their references 213a, 215a, 225a and the processes in which the corresponding data objects are used. For example, T1O1 Status Object 212a and T2O1 Status Object 222a may form a data object net for process 1 240. Similarly, T1O2 Status Object 214a, T2O2 Status Object 224a, and TnO2 Status Object 232a may form a data object net for process 2 250. TnO3 Status Object 234a may form a data object net for process m 260.

The status objects 212a, 214a, 222a, 224a, 232a, 234a may contain identifiers, such as object IDs, for their corresponding data objects 212, 214, 222, 224, 232, 234. The status objects 212a, 214a, 222a, 224a, 232a, 234a may be instantiated from a general status object definition, such as shown in FIG. 1A, or from type-based status object definitions from each type framework 211, 221, 231.

Example 5

Logical Data Object Maintenance

Figure 3:
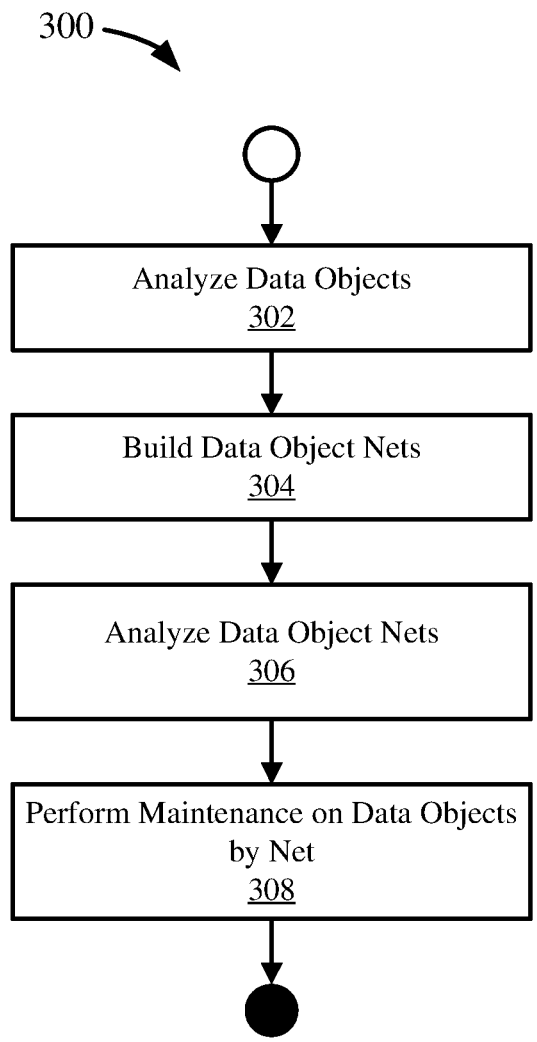
FIG. 3 is a flowchart illustrating a process for data maintenance.

FIG. 3 is a flowchart illustrating a process 300 for data maintenance. The process 300 may be initiated in multiple ways, which may also indicate the scope of logical data objects to analyze and maintain. For example, the process 300 may be initiated as a system maintenance process, such as a batch process on a schedule. Alternatively or additionally, the process 300 may be initiated by a user request or by a system administrator or developer. Further, alternatively or additionally, the process 300 may be initiated by the system based on one or more triggers, such as system performance or memory availability, number of logical data objects in the system, or other system criteria. In some cases, regulatory or other legal requirements may be defined to initiate the process.

Data objects may be analyzed at 302. Analyzing the data objects at 302 may include analyzing instantiated data objects for a type of data object (e.g. instantiated from a given data object definition). Further, such analysis may be performed for all types of data objects available. In such embodiments, the analysis of data objects may be done for each type of data object. For example, the data objects of one type may be analyzed in parallel to the data objects of another type of data object.

Analyzing the data objects at 302 may include accessing a framework for the data objects, such as for a type of data objects, to obtain rules, parameters, or other information for analyzing the data objects. Generally, data objects are analyzed at 302 to determine their use or retention status. The framework for the data objects may include a query for identifying the relevant data objects to analyze, such as may be stored in the metadata of the data object framework. Such a query may return a set of data object IDs for analysis.

The data object framework may also provide rules, parameters, or other values for determining the maintenance or retention status of the data objects, which may be stored in the metadata of the data object framework. For example, the data object framework may provide a parameter for the length of time to retain the type of data objects, or an indicator to archive a data object when no longer in use, or other parameters for data retention or maintenance.

Analyzing the data objects at 302 may include executing a query from the data object framework, and then analyzing the returned data object instances against the parameters and values for maintenance or retention from the data object framework. The query may return identifiers for the data objects, which may be dereferenced to analyze the instantiated data objects themselves, such as to obtain a "created-on" date to determine lifetime of the specific data object. Alternatively or additionally, such information for instantiated data objects may be available in the data object framework metadata itself, which can be analyzed as part of analyzing the data objects at 302. In such cases, the data objects themselves may not need to be accessed. In some embodiments, the parameters and values may be integrated into the query for identifying the data objects. In such cases, the returned results may be data objects (e.g. data object identifiers) that meet the given parameter requirements, such as data objects that meet criteria for maintenance, or do not yet meet criteria for maintenance, or meet criteria for deletion, etc.

Analyzing the data objects at 302 may include setting a status of the instantiated data objects based on the results of the analysis. For example, an indicator for a given data object may be set to indicate the data object is available for deletion, or must be retained, or is still in use by a process, etc. Such an indicator may be set in the data object itself, in metadata for the data object (such as in the data object framework metadata), or both. Generally, analysis of the data objects at 302 may result in the analyzed data objects having an indicator set, based on the parameters in the appropriate data object framework, to indicate the appropriate maintenance actions that may be taken on the individual data objects.

In some cases, such as in a batch system maintenance process, all the data objects in the system may be analyzed at 302. In other cases, the scope of data objects analyzed may be set based on how the process 300 was initiated. For example, a specific program process may be analyzed with the process 300, and so only data object types and instances used or applicable to that process may be analyzed. In other cases, a given type of data object may be analyzed first, and other types may be analyzed based on the results of that analysis.

One or more data object nets may be built at 304. A data object net may be a series of related instantiated data objects. Generally, such data objects are related when they are used by the same program process in the system, and thus are relevant to each other for processing. Thus, generally each process will have a single process data object net which identifies all the data objects used by that process. The data object nets may be built based on the references between data objects stored in the data object frameworks (e.g. in the data object framework metadata, such as shown in FIGS. 1A and 1B). The data object nets may be a collection of the data object IDs for a given process. Generally, a data object net is built for each extant (e.g. open or current) process. Thus, there is generally a single data object net for each process. A data object net may be an array, a linked list of representations of the data objects, or other data structure housing the set or collection of related data objects (e.g. identifiers).

In some embodiments, the data object net may include information about the data objects themselves beyond their identifiers. For example, the data object net may include the status of the individual data objects, or an instruction or direction for maintenance on the data objects. In other embodiments, the metadata for the data object (such as may be stored in the appropriate data object framework) or the data object itself may store status or instruction information.

The data object nets may be analyzed at 306. Analyzing the data object nets at 306 may include traversing the data object net to determine if each data object instance in the data object net is ready for maintenance (e.g. deletion, archiving, etc.). For example, traversing the data object net may include accessing and reading a maintenance indicator for the first data object in the net, accessing and reading an object ID for the next data object in the net, dereferencing that object ID to access and read the maintenance indicator in the next data object, and so on. Generally, all data objects for a process may be treated the same during maintenance. Thus, if all data objects in a data object net are ready for maintenance, such as having a status of "finished," then the data object net may be used to perform maintenance on its data objects at 308. If any data object instance in the data object net has a status differing from the other associated data objects, then the data object net is not ready for maintenance. For example, one data object may require continued retention while the remaining data objects in the data object net are ready for maintenance. In such a case, all the data objects in the data object net may remain with no further action taken.

Analyzing the data object nets at 306 may also include analyzing the related processes to determine if the process itself is completed. Generally, a data object net is composed of data objects for a process or set of related processes (e.g. multithreaded or parallel processing systems). Thus, a data object net is for or associated with a process (or set of processes). If a process is not complete, or not at a given step or status, the data object net for that process may be indicated as not ready for maintenance. In some embodiments, incomplete processes may preclude their data object net from being analyzed. Processes that are complete or otherwise at a given step or status may have their data object nets analyzed, or otherwise indicate that the process is ready for maintenance (independent from if the data objects in the net are ready for maintenance).

For data object nets that are determined to be ready at 306, maintenance may be performed for the data objects of the data object nets at 308. Performing maintenance at 308 may include decoupling the data objects in the data object net from their process. Decoupling may include removing any references to the data objects in the process, such as in process variables or process memory. Such decoupling may ensure that any leftover data after maintenance may be collected by a garbage collection process.

Performing maintenance at 308 may include taking a specified action on the data object instances in the data object net. Generally, this action includes deleting the data object instances. However, maintenance may additionally or alternatively include other actions, such as archiving the data objects, or moving the data objects to a heap for later garbage collection. In some embodiments, performing maintenance may include generating a report of the data objects and their information, such as for a user or individual wanting confirmation of the deletion of personal or sensitive data.

Deleting data objects may be performed by traversing the data object net to dereference the data object IDs and deleting the data object and freeing the associated memory. Deleting may include deleting all persistent copies of a data object, such as deleting an underlying entry in a database for a data object. In some embodiments, deleting may include initiating a process for deletion of the given data object which may remove other references to the data object outside its process, or stored in other accessible storage (e.g. long-term memory). Generally, the data object framework for the maintained data objects may be updated as well (with the appropriate information), such as a removal if the objects were deleted, or an indication if the objects were archived.

Completion of the process 300 may include generating a report or providing an indicator that the process was run and completed, including statistics for data objects addressed and maintenance actions performed.

The data objects as described through process 300 may be status objects for the data objects as described herein. In such cases, the status objects may be dereferenced as needed to access the underlying data objects. For example, performing maintenance on data objects generally includes dereferencing the status objects to perform maintenance on the underlying data objects. In some cases, analyzing data objects may require dereferencing a status object to analyze the underlying data object in cases where additional information not present in the status object or object framework is needed.

Example 6

Data Maintenance Example

Figure 4A:
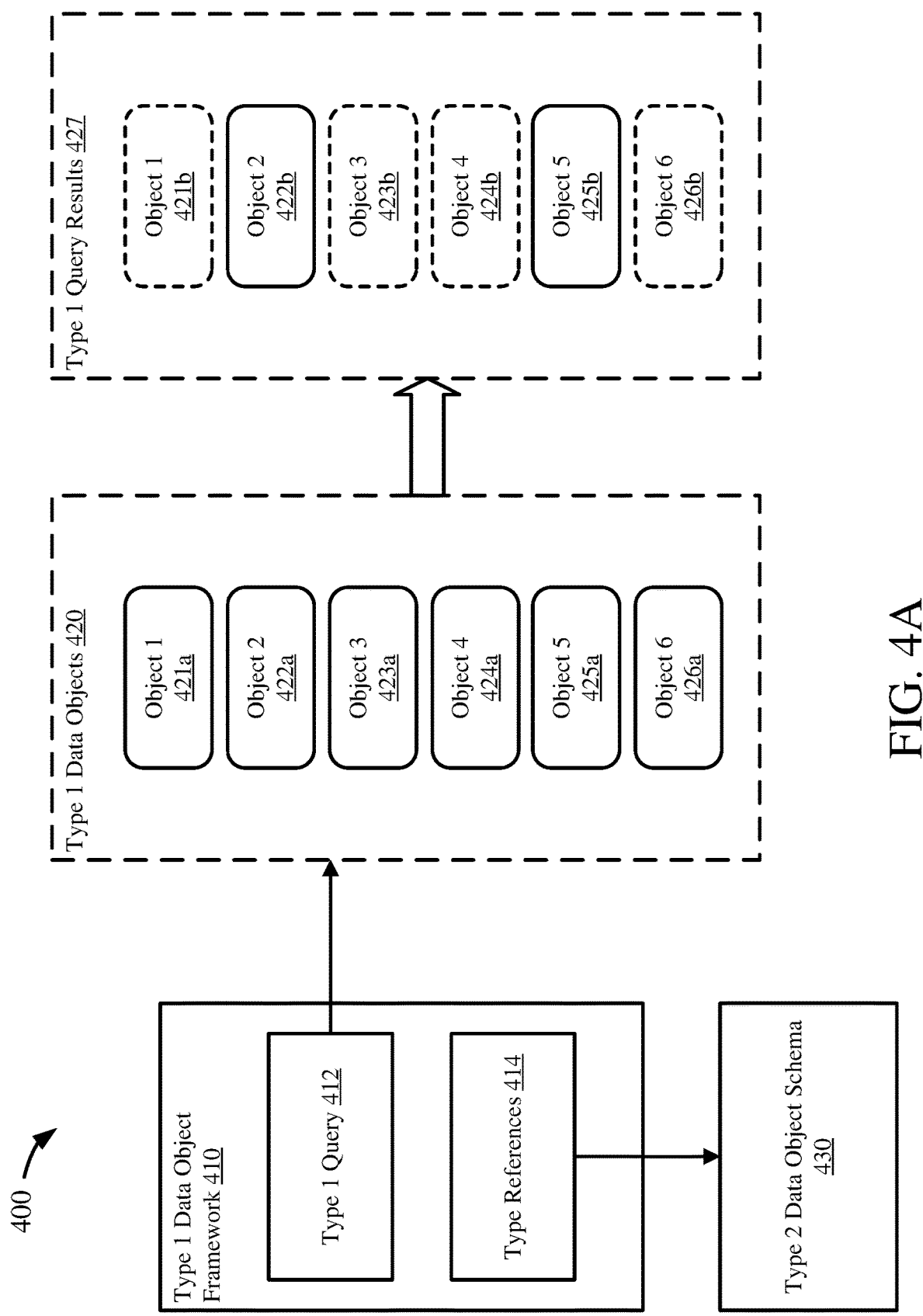
FIGS. 4A and 4B illustrate an example data maintenance process.
Figure 4B:
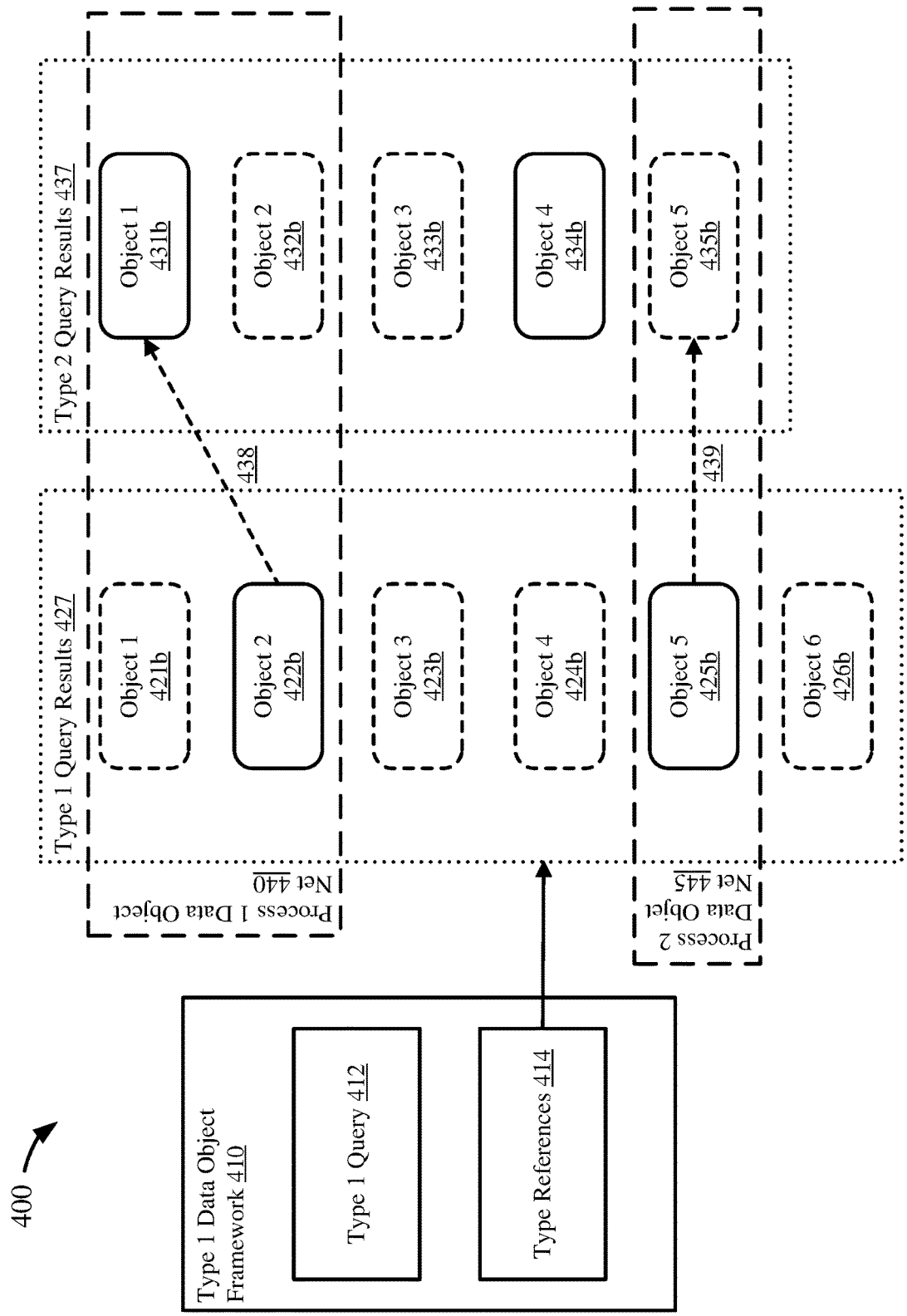

FIGS. 4A and 4B provide an example diagram 400 illustrating the maintenance process 300 of FIG. 3. A data object framework 410 for a type 1 data object may have a type 1 query 412. The type 1 query 412 may be a search string, SQL query, or other search process for identifying instantiated type 1 data objects 420. The type 1 query 412 may be executed against the type 1 data object instances 420, which may have object instances 1-6 421a-426a.

In some embodiments, the type 1 data objects 420 may be status objects for the underlying type 1 data object instances, as described herein. In such embodiments, the data objects 421a-426a may be status object instances for type 1 data object instances. Generally, the example 400 may be performed on status objects, which may be dereferenced to the underlying data objects as needed, such as when performing maintenance actions.

The type 1 query 412 may include parameters and values for identifying type 1 data objects 420 that are ready for maintenance. For example, such parameters or retention criteria may be 'lifecycle status=finished' and 'retention period=3 years.' Further query parameters for the type query 412, which may be included in the type query or in the framework 410, are: TYPE_CODE, OBJECT_ID, RETENTION_STATUS_CODE, PROCESS_RETENTION_STATUS_CODE, CREATION_DATE, and LAST_CHANGED_DATE.

Thus, type 1 query results 427 may indicate that object 1 421b, object 3 423b, object 4 424b, and object 6 426b do not yet meet the criteria. These objects 421b, 423b, 424b, 426b may not be returned in the query results 427, or may be returned with an indicator that they did not meet the parameters. Object 2 422b and object 5 425b may be returned in the query results 427 as having met the query criteria (generally, identifiers for the objects and not the objects themselves may be returned). Thus, for data object type 1, the data object analysis, such as may be performed at step 302 in process 300 shown in FIG. 3, may return object 2 422b and object 5 425b as ready for maintenance. In some embodiments, a status or other indicator may be set for these objects, either as part of the query or after receiving the results of the query.

The type 1 data object framework 410 may include type references 414. The type references 414 may include a general reference to another data object type, such as to the type 2 data object schema 430, which may be a schema identifier. Such a reference may indicate to the process (e.g. process 300 shown in FIG. 3) that type 2 data objects should also be analyzed as well (e.g. at step 302 in process 300). In other embodiments, type 2 data objects may be analyzed without such a reference.

Analysis of the type 2 data object instances may be similar as shown for the type 1 data object instances, and may result in the type 2 query results 437 shown in FIG. 4B. The type 2 data objects may be objects 1-6 431b-435b. The type 2 query results 437 may provide that type 2 object 1 431b and object 4 434b meet the type 2 maintenance parameters.

The type references 414 for the type 1 data object framework 410 may be applied to the type 1 query results 427 to generate the process data object nets 440, 445. The type references 414 may store a reference for type 1 object 2 422b to type 2 object 1 431b. Thus, for process 1, a process 1 data object net 440 may be generated having object 2 422b and object 1 431b. The type references 414 may include a reference for type 1 object 5 425b to type 2 object 5 435b. Thus, for process 2, a process 2 data object net 445, may be generated having object 5 425b and object 5 435b. Other type 1 objects (e.g. 421b, 423b, 424b, 426b) may also have references stored in the type references 414, which may not be applied given that those objects were not returned by the query, or were returned with an indication that they did not meet the maintenance parameters.

Similar type references may be stored for the type 2 data objects in the type 2 data object framework, if applicable for the type 2 data objects. Generating the process data object nets 440, 445 may be carried out similarly as described for step 304 in process 300 as shown in FIG. 3.

With the process data object nets 440, 445 generated for processes 1 and 2, the data object nets may be analyzed, such as described for step 306 in process 300 as shown in FIG. 3. Process 1 data object net 440 has all its data objects, object 2 422b and object 1 431b, having met the maintenance criteria. Thus, the process 1 data object net 440 may be used to perform maintenance on its data objects 422b, 431b, such as described at step 308 in process 300 shown in FIG. 3. Generally, the data objects 422b, 431b may be decoupled from process 1 and then the maintenance actions taken (e.g. deleted).

Process 2 data object net 445 does not have all its objects, object 5 425b and object 5 435b, ready for maintenance because the type 2 object 5 435b was not returned from the type 2 query as being ready for maintenance (e.g. its indicator was not set to being ready). Thus, the process 2 data object net 445 generally does not proceed to having maintenance performed on its data objects 425b, 435b. In some embodiments, the process 2 data object net 445 may be released once no further actions are determined to be needed. In other embodiments, the process 2 data object net 445 may be stored for future reference when the maintenance process (e.g. process 300) is next run.

Example 7

Data Maintenance System Architecture

Figure 5:
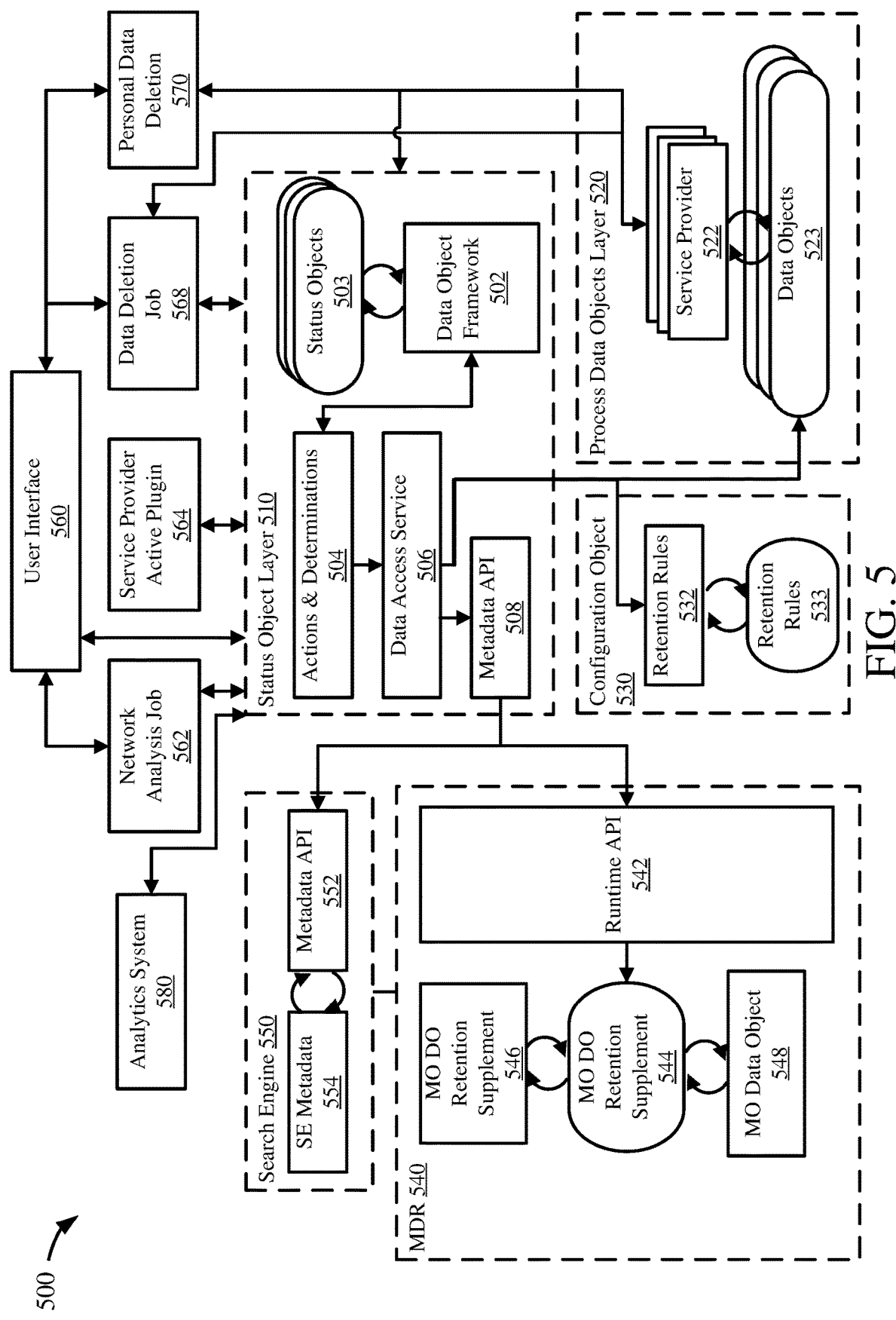
FIG. 5 is an architecture diagram for a data object maintenance system.

FIG. 5 is an architecture diagram for a data object maintenance system 500. The data object maintenance system 500 may have one or more status objects 503 in a status object layer 510, data objects 523 in a process data objects layer 520, a configuration object 530, a metadata repository (MDR) 540, and a search engine 550. The data object maintenance system 500 may be accessed and executed from different interfaces, such as a user interface 560, a network analysis job 562, an enterprise service framework (service provider active) plugin 564, a data deletion job 568, a personal data deletion process 570, an analytics system 580, or a combination thereof.

The process data objects layer 520 may have the instantiated data objects 523 available in the system 500, as described herein. The process data objects layer 520 may also have service providers 522 for accessing the data objects 523 from external interfaces, such as the data deletion job 568 or the personal data deletion process 570. The service providers 522 may additionally or alternatively provide information about the data objects 523, such as statistical information about the data objects, or specific information about data objects, such as data objects that relate to a given process or user. The service providers 522 may act as an interface for the data objects 523 or the process data objects layer 520, and may be created for each data object, for each type of data object, a single service provide for all data objects, or some other division for the data objects.

The configuration object 530 may store retention rules, policies, parameters, or other information regarding data maintenance criteria or requirements 532. The retention rules 532 may also have long-term persistent storage 533. For example, the retention rules 532 may be stored in a database, or a hash table or other data structure, and accessed through the configuration object 530. In some embodiments the configuration object 530 may be wholly or partially implemented with one or more data object frameworks (e.g. 502) as described herein.

The metadata repository (MDR) 540 may store metadata for the data objects 523, the status objects 503, the data object framework 502, or a combination thereof. The MDR 540 may have a runtime API 542 for accessing the metadata in the MDR. The runtime API 542 may access data object metadata 548 and retention metadata 546 for the data objects through persistent storage for the metadata 544. The MDR 540 may include long-term storage for metadata from the data object framework (e.g. 502), as described herein. For example, the MDR 540 may contain queries for accessing the data objects for different data object types, or the references between data objects in a process, etc.

The search engine 550 may provide fast searching functionality for accessing data object metadata. The search engine 550 may have a metadata API 552 for access to search engine metadata 554. The search engine metadata 554 may be indexed metadata for data objects, metadata for commonly accessed data objects, or some other data structure improved or optimized for searching the data object metadata. The search engine 550 may overlay the MDR 540, and may provide reference or location information to metadata in the MDR, or may duplicate some or all of the metadata stored in the MDR for faster access.

The status object layer 510 may act as an orchestration layer for performing data object maintenance. The status object layer 510 may have the status objects 503, which may be lightweight data objects or structures that represent the data objects 523, as described herein, for use during data maintenance analysis (e.g. process 300 shown in FIG. 3). By using status objects 503 to represent the actual data objects 523 in the maintenance process, the system overhead can be lowered, the processing can be separately performed from other non-maintenance activity, and system performance may be increased (both for the data maintenance process and non-maintenance processes, such as those using the data objects 523).

A status object 503 may be associated with or related to a data object framework 502, as described herein. The status object layer 510 may provide separate data object frameworks 502 for different types of data objects, as described herein.

A data object framework 502 may have actions or determinations 504 for analyzing data objects of the same type as the data object framework. Such actions and determinations may include methods or processes for analyzing the data objects for their status and determining maintenance options or applicability for the data objects, such as based on retention rules 532 in the configuration object 530.

The actions and determinations 504 may access a data access service 506 for communicating with or otherwise accessing the configuration object 530 (e.g. retention rules 532) or the process data objects 523 (e.g. the instantiated data objects 523). The data access service 506 may act as an interface layer for the data object framework 502 to access the configuration object 530 and the related process data objects 523. The data access service 506 may also access a metadata API 508 for the status objects 503. The metadata API 508 may access, for the data object framework 502 through the actions 504 and the data access service 506, the MDR 540 runtime API 542 to obtain data object and framework metadata for the data object framework. Additionally or alternatively, the metadata API 508 may access the search engine 550 metadata API 552 for faster searching of at least some of the stored metadata.

Through the data access service 506 and the metadata API 508, the data object framework 502 may access and obtain information from the other components of the data object maintenance system 500.

A data object maintenance process, such as process 300 shown in FIG. 3, may be initiated via a user interface 560, which may access the status object layer 510 for performing maintenance on the process data objects 523. The user interface 560 may directly initiate the process with the status object layer 510, or it may initiate more specific versions of the data object maintenance process, such as the network analysis job 562, the data deletion job 568, or the personal data deletion process 570.

The user interface 560 may visualize the status objects 503, and process nets formed from the status objects, as described herein. Such visualization may include graphical or lexical descriptions of the status objects 503, their related data objects 523 and associated processes, and the networks formed from the status objects. The user interface 560 may also provide data maintenance analytics in addition to the status objects 503, similarly as may be provided or used in analytics system 580. Details about the status objects 503 may be provided as well, such as their metadata.

The network analysis job 562 may be initiated by a data administration process, system maintenance process, as a scheduled process, or via other system trigger. The network analysis job 562 may be a mass data object run, such as traversing the status objects 503 in the status object layer 510. The network analysis job 562 may access the status object layer 510 to execute the data maintenance process, and may receive back analytical or statistical information about the data objects, and any maintenance performed or deferred on the process data objects 523.

The data deletion job 568 may be initiated by a data administration process, system maintenance process, as a scheduled process, or via other system trigger. In some embodiments, the data deletion job 568 may be a mass data object run, such as traversing over the status objects 503 in the status object layer 510. The data deletion job 568 may access the status object layer 510 to execute the data maintenance process, and may delete data objects as part of the data object maintenance. In some embodiments, the data deletion job 568 may be initiated by other processes, such as the network analysis job 562, such as when data object deletion is specifically required. The data deletion job 568 may receive as inputs specific data object instances or metadata for deletion, which may be executed pursuant to the retention rules and other maintenance analysis, or executed as an override of such rules. The data deletion job 568 may be used similar to a garbage collection process for deleting data objects or metadata that was missed or otherwise erroneously not deleted, or temporarily kept when ready for deletion.

The personal data deletion process 570 may be initiated by a data administration process, system maintenance process, or by a user request through the user interface or to a system administrator or system owner. The personal data deletion process 570 may access the status object layer 510 to execute the data maintenance process, and may delete data objects as part of the data object maintenance, such as specifically data objects that include personal data for the requesting user. In some embodiments, the personal data deletion process 570 may be initiated by other processes, such as the network analysis job 562, such as when personal data object deletion is specifically required. The personal data deletion process 570 may receive as inputs specific data objects or metadata for deletion, such as data objects relating to a particular requestor or user, which may be executed pursuant to the retention rules and other maintenance analysis, or executed as an override of such rules. In some embodiments, deletion of personal data upon request of the data's owner may be in compliance with the retention rules, even if no other rules or criteria are met.

The personal data deletion process 570 may access the process data objects 523 directly, such as accessing the service providers 522 for the data objects 523, rather than accessing the status object layer 510.

A service provider active plugin 564 may provide access to data maintenance functionality as described herein for a software system using data objects. The service provider active plugin 564 may access the status object layer 510 to initiate and perform data object maintenance. The service provider active plugin 564 may act as a listener for incoming data maintenance requests, and may act to block unwanted or otherwise incorrect or unnecessary requests.

The service provider active plugin 564 may also act to manage data maintenance requests. For example, the service provider active plugin 564 may be used to ensure deletion of a data object whose process(es) is already ended. As another example, the service provider active plugin 564 may block changes to data objects that have already been set for removal or data maintenance, or otherwise are no longer valid or used data objects, even if not yet deleted. As another example, the service provider active plugin 564 may be used to synchronize data object instances. The service provider active plugin 564 may inject data into requests to effectively manage data maintenance requests. To effect some of these functionalities, the service provider active plugin 564 may be accessed by other interfaces of FIG. 5.

An analytics system 580 may access the status object layer 510 to initiate and perform data object maintenance or obtain analytical or statistical information about data object maintenance or retention. Such analytical systems 580 may be used to generate information or reports to analyze compliance with the retention rules, or with regulatory or legal requirements.

Example 8

Additional Data Maintenance Processes

Figure 6A:
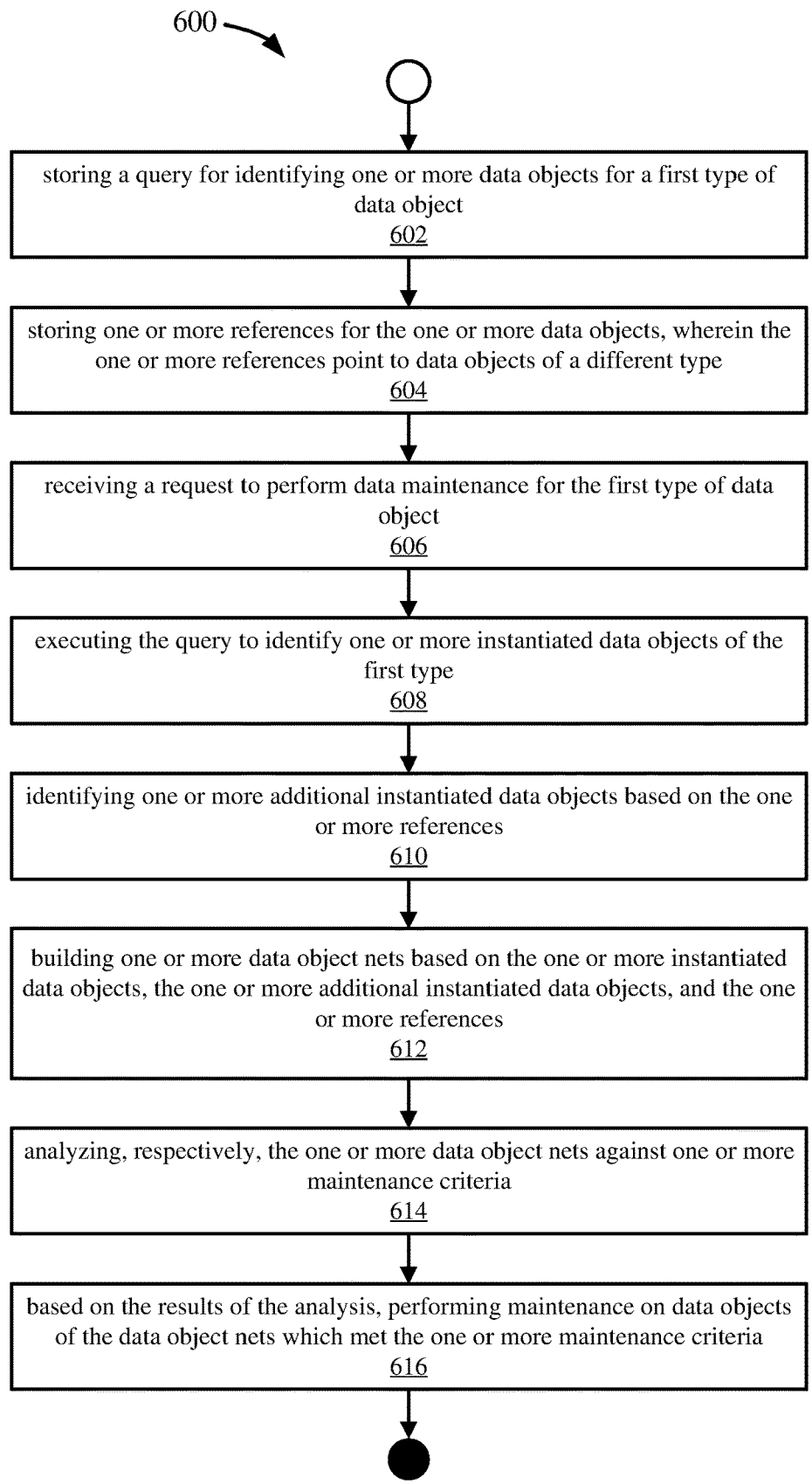
FIG. 6A is a flowchart illustrating a method for metadata-driven enforcement of data retention policies.

FIG. 6A is a flowchart illustrating a method 600 for metadata-driven enforcement of data retention policies. A query for identifying one or more data objects for a first type of data object is stored at 602. One or more references for the one or more data objects are stored at 604. The one or more references may point to data objects of a different type. A request to perform data maintenance for the first type of data object is received at 606. The query to identify one or more instantiated data objects of the first type is executed at 608. One or more additional instantiated data objects are identified based on the one or more references at 610. One or more data object nets are built based on the one or more instantiated data objects, the one or more additional instantiated data objects, and the one or more references at 612. The one or more data object nets are respectively analyzed against one or more maintenance criteria at 614. Based on the results of the analysis, maintenance is performed on data objects of the data object nets which met the one or more maintenance criteria at 616.

Figure 6B:
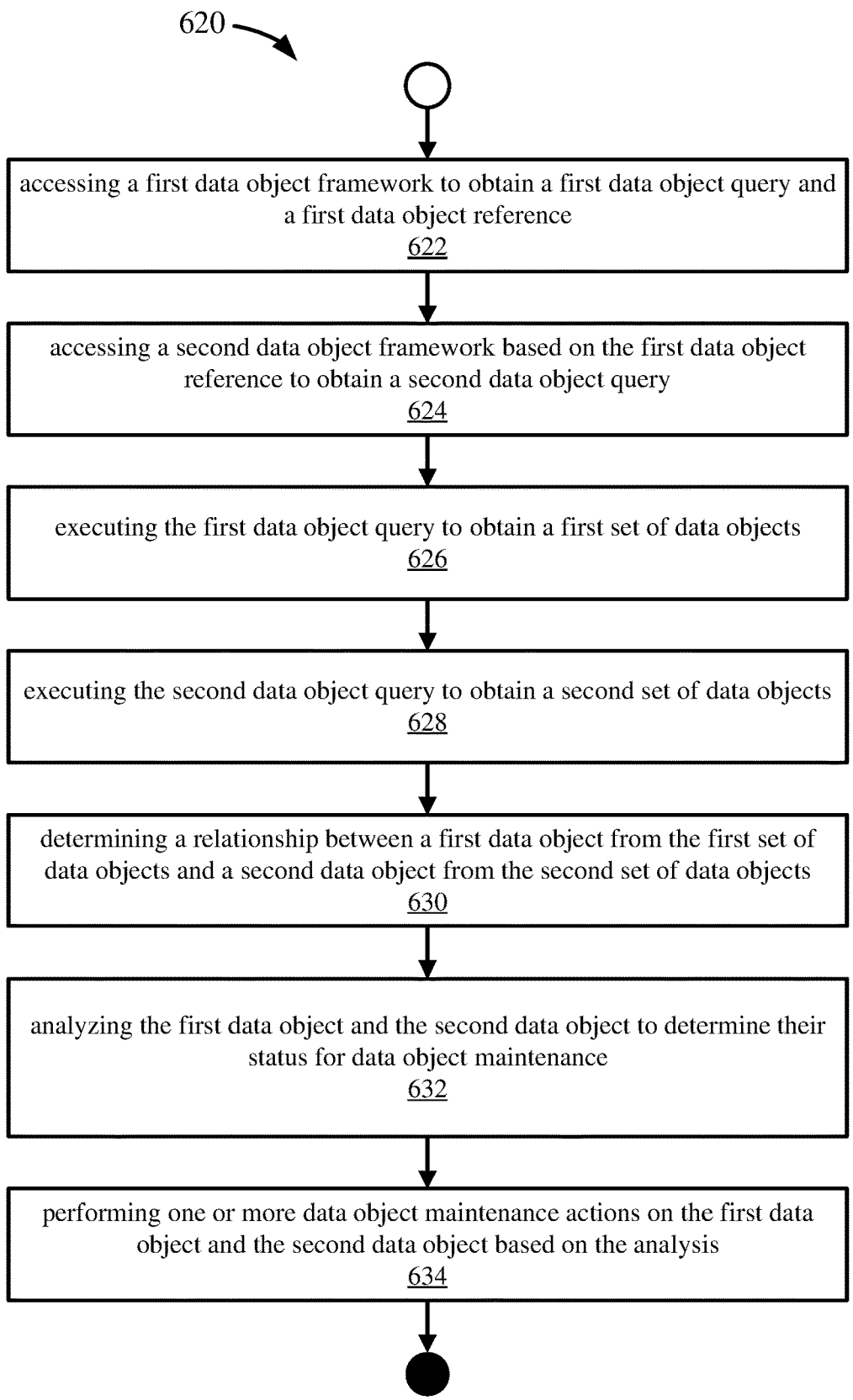
FIG. 6B is a flowchart illustrating a method for data maintenance.

FIG. 6B is a flowchart illustrating a method 620 for data maintenance. A first data object framework is accessed to obtain a first data object query and a first data object reference at 622. A second data object framework is accessed based on the first data object reference to obtain a second data object query at 624. The first data object query is executed to obtain a first set of data objects at 626. The second data object query is executed to obtain a second set of data objects at 628. A relationship between a first data object from the first set of data objects and a second data object from the second set of data objects is determined at 630. The first data object and the second data object are analyzed to determine their status for data object maintenance at 632. One or more data object maintenance actions are performed on the first data object and the second data object based on the analysis at 634.

Figure 6C:
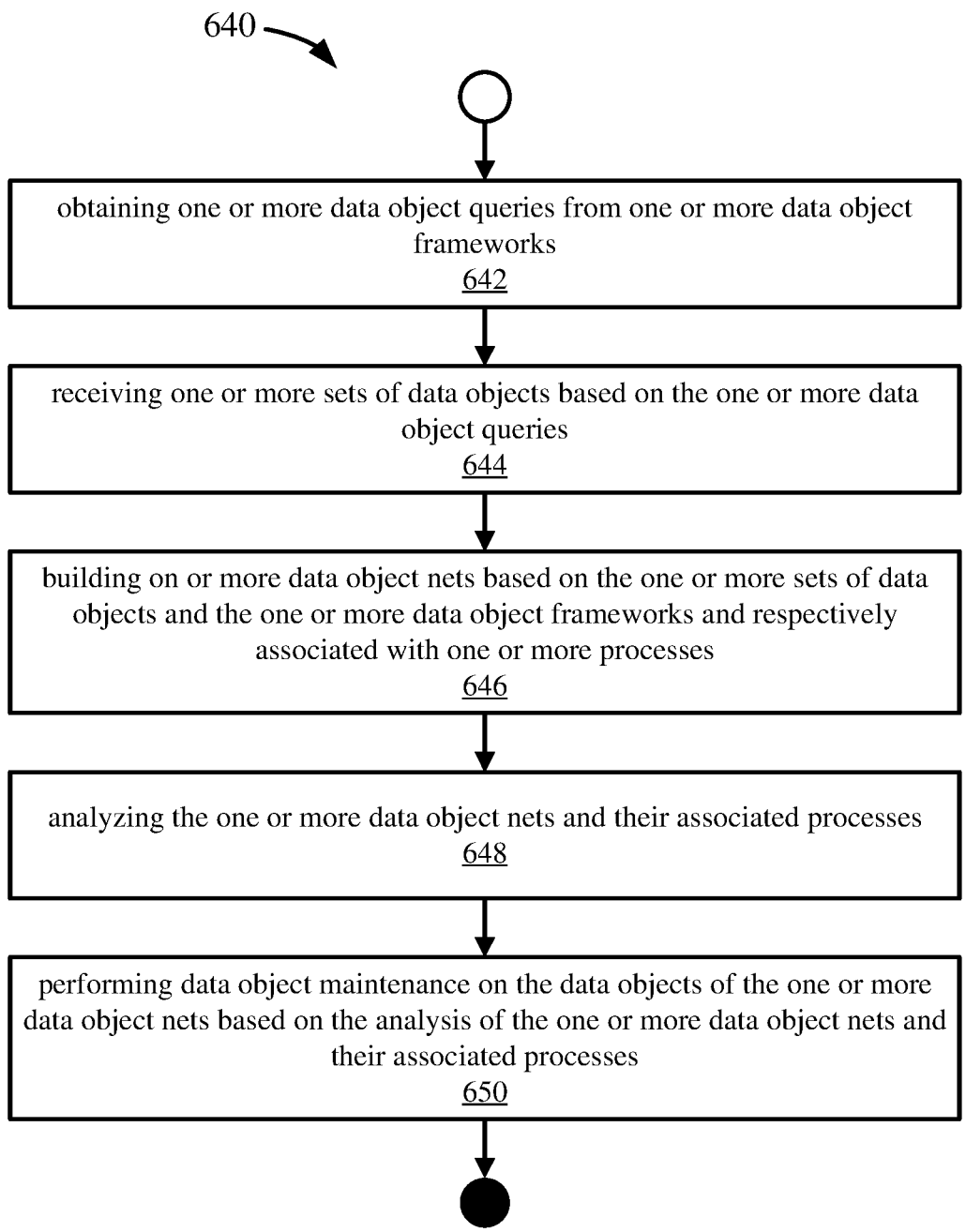
FIG. 6C is a flowchart illustrating a method for metadata-driven data maintenance.

FIG. 6C is a flowchart illustrating a method 640 for metadata-driven data maintenance. One or more data object queries are obtained from one or more data object frameworks at 642. One or more sets of data objects are received based on the one or more data object queries at 644. One or more data object nets are built based on the one or more sets of data objects and the one or more data object frameworks and respectively associated with one or more processes at 646. The one or more data object nets and their associated processes are analyzed at 648. Data object maintenance is performed on the data objects of the one or more data object nets based on the analysis of the one or more data object nets and their associated processes at 650.

Example 9

Computing Systems

Figure 7:
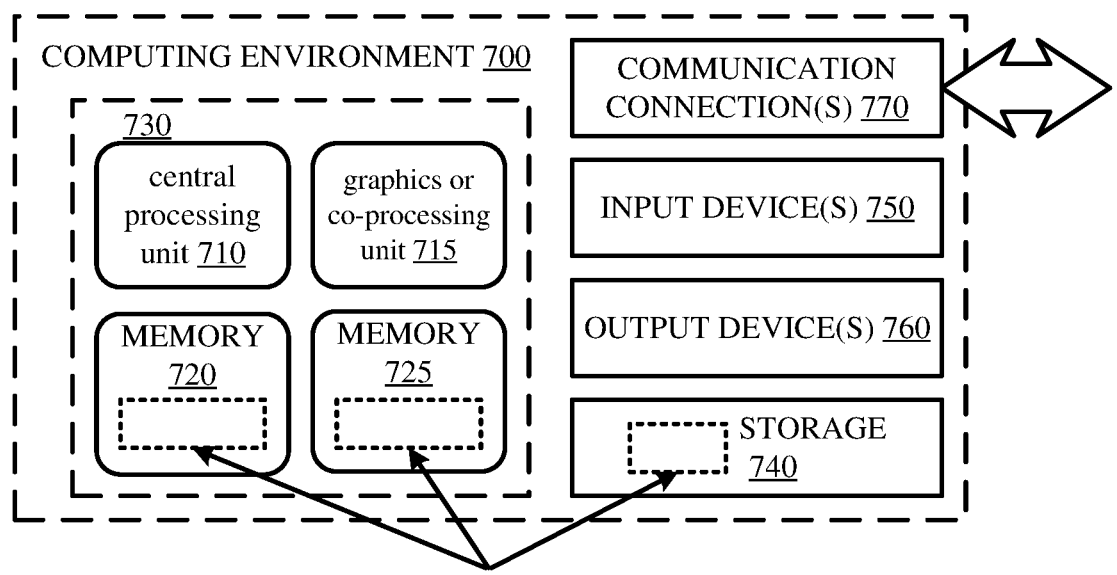
FIG. 7 is a diagram of an example computing system in which described embodiments can be implemented.

FIG. 7 depicts a generalized example of a suitable computing system 700 in which the described innovations may be implemented. The computing system 700 is not intended to suggest any limitation as to scope of use or functionality of the present disclosure, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions, such as for implementing components of the processes of FIGS. 3 and 6A-C, the data structures of FIGS. 1A-C, the examples of FIGS. 2A-B and 4A-B, or the systems of FIG. 5. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), nonvolatile memory (e.g., ROM, EEPROM, flash memory, etc.), or some combination of the two, accessible by the processing unit(s) 710, 715. The memory 720, 725 stores software 780 implementing one or more innovations described herein, in the form of computer-executable instructions suitable for execution by the processing unit(s) 710, 715. The memory 720, 725, may also store settings or settings characteristics, data structures and examples shown in FIGS. 1A-B, 2A-B, and 4A-B, systems shown in FIG. 5, or the steps of the processes shown in FIGS. 3 and 6A-C.

A computing system 700 may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing system 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 10

Cloud Computing Environment

Figure 8:
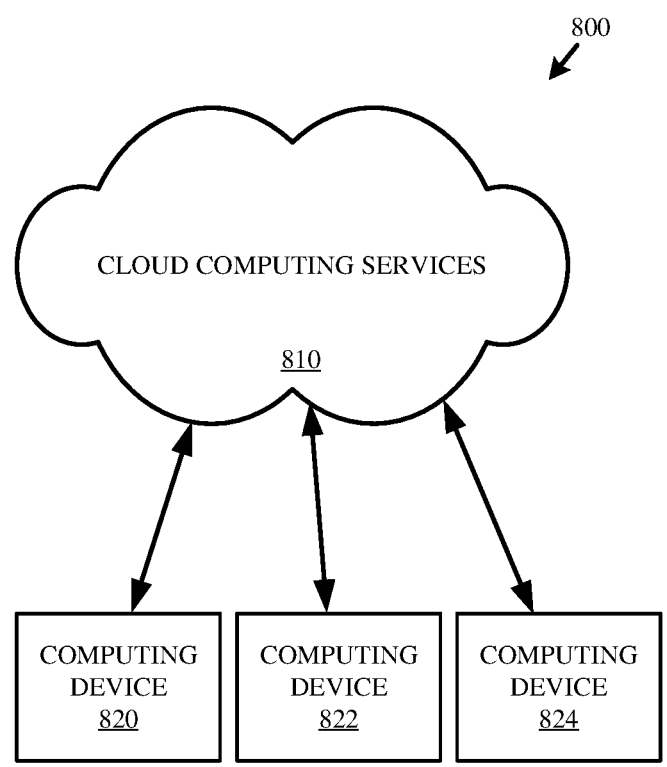
FIG. 8 is an example cloud computing environment that can be used in conjunction with the technologies described herein.

FIG. 8 depicts an example cloud computing environment 800 in which the described technologies can be implemented. The cloud computing environment 800 comprises cloud computing services 810. The cloud computing services 810 can comprise various types of cloud computing resources, such as computer servers, data storage repositories, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 824. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operations (e.g., data processing, data storage, and the like).

Example 11

Implementations

Although the operations of some of the disclosed methods are described in a particular sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 7, computer-readable storage media include memory 720 and 725, and storage 740. The term computer-readable storage media does not include signals and carrier waves. In addition, the term computer-readable storage media does not include communication connections (e.g., 770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A system for metadata-driven enforcement of data retention policies, the system comprising:
   one or more tangible memories;
   one or more processing units coupled to the one or more memories; and
   one or more computer-readable storage media storing instructions that, when loaded into the one or more memories, cause the one or more processing units to perform data maintenance operations comprising:
      instantiating a plurality of status data objects, wherein a given status data object comprises status information for an associated first data object having a first type, the first status data object thus storing metadata for the associated first data object, wherein at least a portion of the status data objects comprise one or more references to one or more status data objects not in the plurality of status data objects;
      storing a query for identifying one or more of the plurality of first status data objects;
      receiving a request to perform data maintenance for the first type of data object;
      executing the query to identify one or more instantiated first status data objects to provide one or more identified first status data objects;
      identifying one or more second status data objects based on the one or more references to provide one or more identified second status data objects;
      building one or more data object nets based on the identified one or more first status data objects and the one or more second status data objects, wherein a given data object net of the one or more data object nets comprises identifiers for particular identified first status data objects that are associated with an identified process;
      analyzing, respectively, the one or more data object nets against one or more maintenance criteria; and
      based at least in part on results of the analyzing, performing maintenance on data objects associated with status data objects of the one or more data object nets which meet the one or more maintenance criteria.

2. The system of claim 1, wherein the data objects comprise logical data objects.

3. The system of claim 1, wherein the given status data object comprises an identifier for its associated first data object.

4. The system of claim 3, wherein performing maintenance on data objects of the one or more data object nets comprises dereferencing the identifier to access the data objects associated with the given status data object.

5. The system of claim 1, wherein at least one of the one or more status data objects is included in at least two of the one or more data object nets, each data object net representing a different computer-implemented process.

6. The system of claim 1, wherein analyzing the one or more data object nets further comprises determining whether at least one process associated with a data object net of the one or more data object nets has completed.

7. A method, implemented in a computing system comprising at least one hardware processor and at least one memory coupled to the at least one hardware processor, the method comprising:
   instantiating a plurality of data objects of a first type;
   instantiating a plurality of data objects of a second type, at least a portion of the data objects of the second type referencing one or more data objects of the first type;
   accessing a first data object framework for the data objects of the first type to obtain a first data object query and a reference to the second type of data object;
   accessing a second data object framework based on the reference from the first data object framework to obtain a second data object query;
   executing the first data object query to obtain a first set of data objects;
   executing the second data object query to obtain a second set of data objects;
   defining a first data object net as at least a portion of data objects of the second set and data objects of the first set referenced by the at least a portion of data objects of the second set;
   analyzing data objects of the first data object net to determine their status for data object maintenance; and,
   performing one or more data object maintenance actions on data objects of the first data object net based on the analysis.

8. The method of claim 7, wherein the data objects comprise logical data objects.

9. The method of claim 7, wherein the first data object net is associated with a particular process.

10. The method of claim 9, wherein performing the data object maintenance actions comprises decoupling data objects of the first data object net from their associated process.

11. The method of claim 7, wherein the at least one of the first data object query and the second data object query respectively comprises criteria for data object maintenance.

12. The method of claim 7, further comprising:
   setting maintenance indicators for the at least a portion of data objects of the first set or data objects of the second set based on results of the first data object query or the second data object query.

13. The method of claim 7, wherein the one or more maintenance actions comprise deleting the first data object and the second data object.

14. One or more non-transitory computer-readable storage media comprising:
   computer-executable instructions that, when executed by a computing system comprising at least one hardware processor and at least one memory coupled to the at least one hardware processor, cause the computing system to instantiate a plurality of status data objects, wherein a given status data object comprises status information for an associated data object having a first type, the first status data object thus storing metadata for the associated first data object, wherein at least a portion of the status data objects comprise one or more references to one or more status data objects not in the plurality of status data objects;
   computer-executable instructions that, when executed by the computing system, cause the computing system to obtain one or more status data object queries from one or more data object frameworks;
   computer-executable instructions that, when executed by the computing system, cause the computing system to receive one or more sets of status data objects based on the one or more data object queries;
   computer-executable instructions that, when executed by the computing system, cause the computing system to build one or more data object nets based on the one or more sets of status data objects and the one or more data object frameworks and respectively associated with one or more processes;
   computer-executable instructions that, when executed by the computing system, cause the computing system to analyze the one or more data object nets and their associated processes; and,
   computer-executable instructions that, when executed by the computing system, cause the computing system to perform data object maintenance data objects associated with status data object of the one or more data object nets based on the analysis of the one or more data object nets and their associated processes.

15. The one or more non-transitory computer-readable storage media of claim 14, wherein the data objects comprise logical data objects.

16. The one or more non-transitory computer-readable storage media of claim 14, wherein the given status data object comprises an identifier for its associated first data object.

17. The one or more non-transitory computer-readable storage media of claim 14, wherein performing maintenance on data objects of the data object nets comprises dereferencing data object identifiers stored in status data objects of the one or more sets to access the data objects of the data object nets.

18. The one or more non-transitory computer-readable storage media of claim 14, wherein the one or more status data object queries respectively comprise criteria for data object maintenance.

19. The one or more non-transitory computer-readable storage media of claim 14, further comprising:
   computer-executable instructions that, when executed by the computing system, cause the computing system to set maintenance indicators for the received status data objects based on the results of the one or more queries.

20. The one or more non-transitory computer-readable storage media of claim 14, wherein performing data object maintenance comprises decoupling data objects from their respective associated processes.

* * * * *